(12) United States Patent
Iseli et al.

(10) Patent No.: US 7,613,071 B2
(45) Date of Patent: Nov. 3, 2009

(54) SEISMIC TELEMETRY SYSTEM WITH STEERABLE ANTENNAS

(75) Inventors: James Iseli, Allen, TX (US); Kambiz Afkami, Richardson, TX (US); Xiabong Wu, Plano, TX (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 11/190,742

(22) Filed: Jul. 27, 2005

(65) Prior Publication Data

US 2005/0259514 A1    Nov. 24, 2005

Related U.S. Application Data

(63) Continuation of application No. 09/361,020, filed on Jul. 23, 1999, now Pat. No. 7,218,890.

(60) Provisional application No. 60/095,696, filed on Aug. 7, 1998, provisional application No. 60/095,792, filed on Aug. 7, 1998.

(51) Int. Cl.
*G01V 1/22* (2006.01)
(52) U.S. Cl. ............................................. 367/77; 76/80
(58) Field of Classification Search ................. 367/76, 367/77–80; 342/367, 368; 370/330
See application file for complete search history.

(56) References Cited

U.S. PATENT DOCUMENTS

| | | | | |
|---|---|---|---|---|
| 2,700,753 | A * | 1/1955 | Peterson | 367/77 |
| 3,283,295 | A * | 11/1966 | Montgomery | 367/77 |
| 3,604,004 | A * | 9/1971 | Buyer | 342/386 |
| 3,806,864 | A * | 4/1974 | Broding et al. | 367/77 |
| 3,886,494 | A * | 5/1975 | Kostelnicek et al. | 367/77 |
| 3,900,825 | A * | 8/1975 | Hinnant | 367/77 |
| 4,066,993 | A | 1/1978 | Savit | 340/15.5 TS |
| 4,493,063 | A * | 1/1985 | Tims et al. | 367/77 |
| 4,521,893 | A * | 6/1985 | Bellman | 375/356 |
| 4,815,044 | A * | 3/1989 | Deconinck et al. | 367/77 |
| 4,908,803 | A | 3/1990 | Rialan | 367/77 |
| 4,967,400 | A | 10/1990 | Woods | 367/21 |
| 5,303,240 | A * | 4/1994 | Borras et al. | 370/347 |
| 5,594,720 | A * | 1/1997 | Papadopoulos et al. | 370/330 |
| 5,603,089 | A * | 2/1997 | Searle et al. | 455/507 |
| 5,625,885 | A * | 4/1997 | Nakazawa et al. | 340/7.22 |

(Continued)

FOREIGN PATENT DOCUMENTS

EP    0250280 A1    12/1987

(Continued)

OTHER PUBLICATIONS

Swales, et al. "Multi-beam Adaptive Base-Station Antennas for Cellular Land Mobile Radio Systems." IEEE 1989.*

*Primary Examiner*—Jack W. Keith
*Assistant Examiner*—Scott A Hughes
(74) *Attorney, Agent, or Firm*—Madan & Sriram, P.C.

(57) ABSTRACT

A system for remotely controlling, acquiring and monitoring the acquisition of seismic data. The system includes remote equipment for collecting seismic data and for transmitting and receiving communication signals to and from a remote location. The system also includes local equipment for transmitting and receiving communication signals to and from the remote location. In this manner, the collection of seismic data at remote locations can be controlled and monitored locally.

21 Claims, 22 Drawing Sheets

U.S. PATENT DOCUMENTS

| | | | |
|---|---|---|---|
| 5,696,903 A | 12/1997 | Mahany | 395/200.58 |
| 5,706,250 A | 1/1998 | Rialan et al. | 367/77 |
| 5,742,593 A * | 4/1998 | Sharony et al. | 370/330 |
| 5,818,385 A * | 10/1998 | Bartholomew | 342/372 |
| 5,822,273 A | 10/1998 | Bary et al. | 367/77 |
| 5,930,293 A | 7/1999 | Light et al. | 375/211 |
| 6,070,129 A * | 5/2000 | Grouffal et al. | 702/32 |
| 6,219,620 B1 * | 4/2001 | Park et al. | 702/14 |
| 6,226,601 B1 | 5/2001 | Longaker | 702/79 |
| 6,240,094 B1 | 5/2001 | Schneider | 370/412 |
| 6,512,481 B1 * | 1/2003 | Velazquez et al. | 342/367 |

FOREIGN PATENT DOCUMENTS

| | | |
|---|---|---|
| EP | 0552769 A2 | 7/1993 |
| EP | 0552769 A3 | 7/1993 |
| WO | WO98/18022 | 4/1998 |
| WO | WO99/60424 | 11/1999 |

\* cited by examiner

SEISMIC TELEMETRY SYSTEM WITH STEERABLE ANTENNAS

CROSS-REFERENCE TO RELATED APPLICATIONS

This application is a continuation of U.S. patent application Ser. No. 09/361,020 for "Seismic Telemetry System" filed on Jul. 23, 1999 now U.S. Pat. No. 7,218,890, which application claims the benefit of the filing date of U.S. Provisional Application No. 60/095,696 filed on Aug. 7, 1998, and U.S. Provisional Application No. 60/095,792 filed on Aug. 7, 1998, all disclosures of which are hereby incorporated herein by reference.

BACKGROUND OF THE INVENTION

This invention relates generally to remote control systems, and in particular to remote control systems for seismic acquisition systems.

Seismic acquisition systems are used to gather seismic data. Typically seismic acquisition systems are used to gather seismic data in remote locations all around the world. Furthermore, seismic acquisition systems are commonly installed and operated on mobile platforms such as, for example, trucks, barges and boats. Existing seismic acquisition systems do not permit remote control and monitoring of the acquisition of seismic data.

The present invention is directed to overcoming one or more of the limitations of the existing seismic acquisition systems.

SUMMARY OF THE INVENTION

According to one aspect of the invention a seismic data acquisition apparatus comprises a base station, a first antenna coupled to the base station, a seismic sensor deployed at a seismic sensor location remote from the base station, a second antenna coupled to the seismic sensor providing wireless communication with the base station, the base station receiving a sensor signal from the seismic sensor location. At least one of the first antenna and the second antenna comprises a steerable antenna steerable toward the other of the seismic sensor location and the base station without manually aiming or positioning the steerable antenna.

In another aspect, the steerable antenna scans a sector and is used to determine a direction of the other of the seismic sensor location and the base station. The scan may be a substantially 360° sector around the base station for a received signal strength to determine a direction of the each of the plurality of seismic sensor locations.

In another aspect, the seismic sensor location comprises a plurality of seismic sensor locations and the second antenna comprises a plurality of second antennas, each of the plurality of second antennas being located at a respective seismic sensor location, the first antenna including the steerable antenna, the steerable antenna being steerable to communicate with each of the plurality of seismic sensor locations. The plurality of seismic sensor locations and the plurality of second antennas may be such that each of the plurality of second antennas are located at a respective seismic sensor location, and each of the plurality of second antennas may include a respective steerable antenna, each steerable antenna being steerable to communicate with the base station. The base station may comprise a plurality of base stations.

In other aspects, the first and/or second antenna may be an active antenna array or an active beamformer.

In yet another aspect of the invention, the apparatus comprises a recorder; and a recorder interface in communication with the recorder and the base station, the recorder interface receiving the sensor signal from the base station and transmitting the sensor signal to the recorder for recording the sensor signal. A wireless communication link or wireline may be used to couple the base station to the recorder interface. The wireless communication link may comprise a pair of directional antennas.

In yet another aspect, the seismic sensor location comprises a plurality of seismic sensor locations, the second antenna comprises a plurality of second antennas each of the plurality of second antennas being located at a respective seismic sensor location, the base station comprises a plurality of base stations, the first antenna comprises a plurality of first antennas each of the plurality of first antennas being coupled to a respective base station, wherein each base station in the plurality of base station is adapted to receive sensor signals from one or all of the plurality of seismic sensor locations. The wireless communication includes one or more of (1) time division, (2) frequency division, (3) code division, (4) space division, and (5) polarization division.

In another aspect of the invention a method of wirelessly coupling a seismic sensor location to a base station remotely located from the seismic sensor location comprises coupling a first antenna to the base station, coupling a second antenna to a seismic sensor, the seismic sensor being located at the seismic sensor location, wherein at least one of the first antenna and the second antenna comprises a steerable antenna, steering the steerable antenna toward the other of the seismic sensor location and the base station, and wirelessly communicating between the seismic sensor location and the base station without manually aiming or positioning the steerable antenna.

DETAILED DESCRIPTION OF THE ILLUSTRATIVE EMBODIMENTS

Several alternative embodiments of a seismic acquisition system are provided that include wireless and wireline communication links. In several preferred implementations, the seismic acquisition system includes groups of sensors coupled to a base station to provide a cellular architecture for acquiring seismic data. In several other preferred implementations, the seismic acquisition system includes a hierarchical architecture. In this manner, the present disclosure provides a plurality of embodiments of systems for monitoring and controlling the acquisition of data that have application to data gathering generally.

Figure 1:
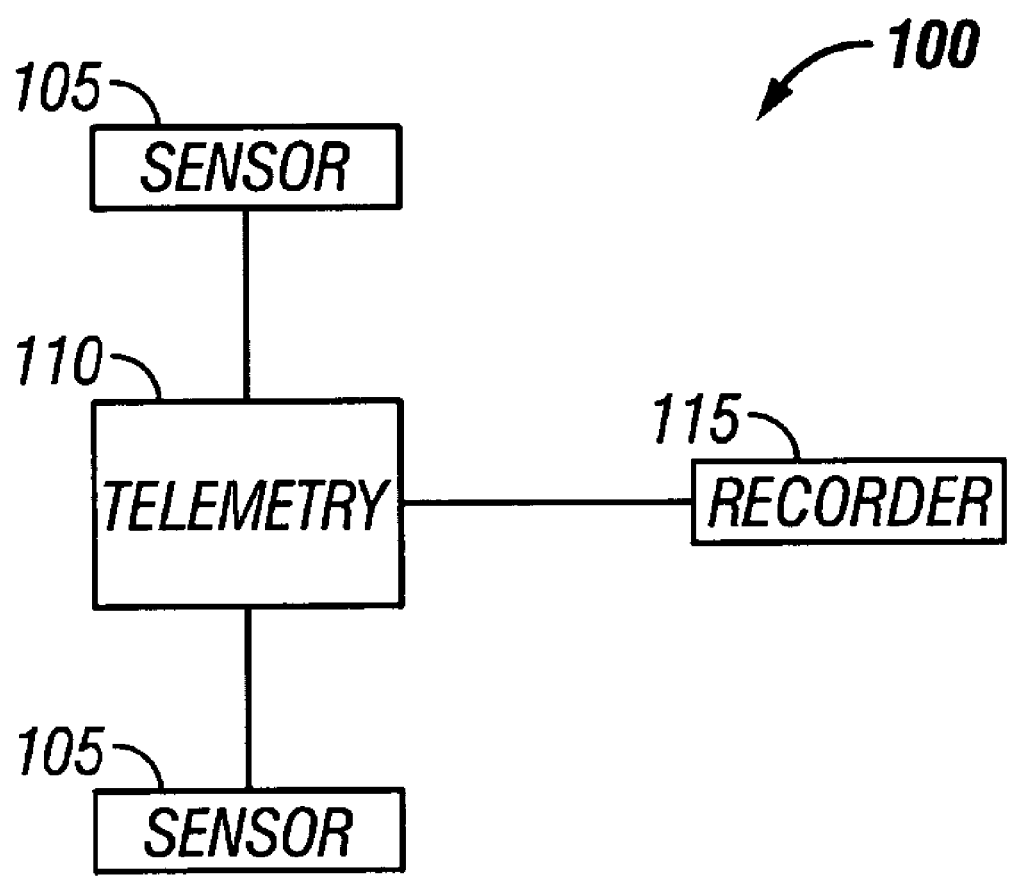
FIG. 1 is a schematic illustration of an embodiment of a seismic acquisition system.

Referring initially to FIG. 1, a seismic acquisition system 100 includes one or more sensors 105, telemetry 110 and a recorder 115.

The sensors 105 sense environmental conditions and generate signals representative of the sensed conditions. The sensors 105 are preferably coupled to the telemetry 110. The telemetry 110 transmits the sensor signals to the recorder 115. The telemetry 110 may include wireline, wireless and/or a combination of wireline and wireless communication links. The recorder 115 is coupled to the telemetry 110 and records the sensor signals transmitted by the telemetry 110.

Figure 2:
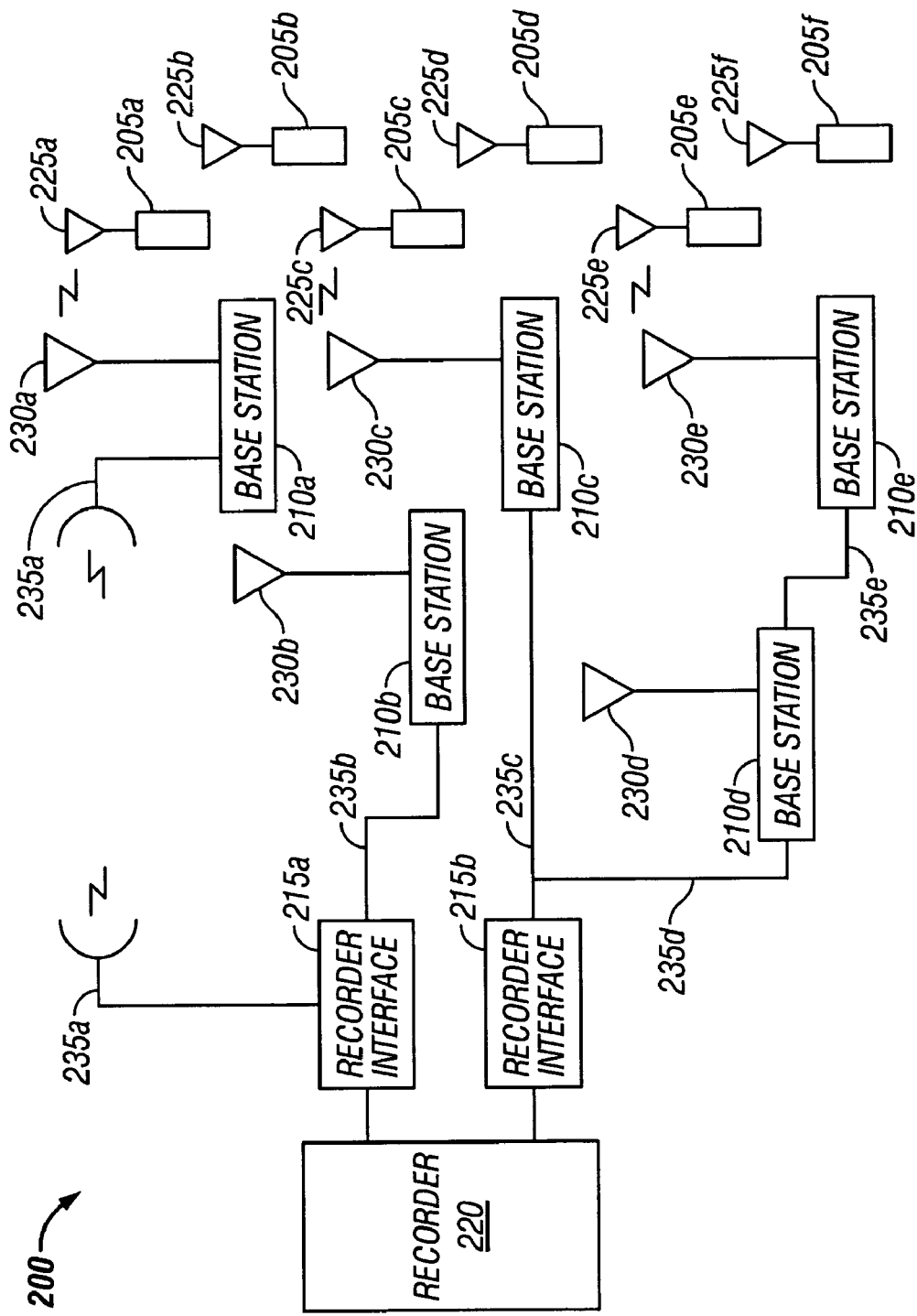
FIG. 2 is a schematic illustration of an embodiment of a seismic acquisition system including a distributed wireless architecture.

Referring to FIG. 2, a seismic acquisition system 200 includes sensors 205a-205f, base stations 210a-210e, recorder interfaces 215a and 215b, and a recorder 220.

The sensors 205a-205f sense environmental conditions and generate signals representative of those sensed environmental conditions. The sensors 205a-205f are coupled to one or more of the base stations 210a-210e. The sensors 205a-205f may be coupled to the base station 210a-210e using a wireline or a wireless communications link.

In a preferred embodiment, the sensors 205a-205f include a radio transceiver that is at least partially implemented in software. In a preferred embodiment, the software radio implementation includes the steps of digitizing the final IF using a wide bandwidth A/D converter; but not at a high interval. In particular, the sample interval is selected to meet the Nyquist criterion for the information bandwidth, but not the IF frequency. Thus, because the input signal is bandlimited, the undersampling aliases the IF frequency down to baseband. The final channel filtering, I and Q splitting and demodulation is done completely digitally. In this manner, the radio hardware cost is limited and provides an optimal platform for adaptively changing the channel bandwidth, modulation scheme, and data rates.

In a preferred embodiment, the sensors 205a-205f further include antennas 225a-225f. In a preferred embodiment, one or more of the antennas 225a-225f comprise active antenna arrays or active beamformers. In this manner, the capacity of the communication channels are optimized. In a preferred embodiment, one or more of the antennas 225a-225f comprise steerable antennas. In this manner, deployment of sensors 205 does not require aiming or positioning of the antennas 225a-225f. Instead, in a preferred embodiment, the antennas 225a-225f scan in 360° sector around the sensors 205a-205f and monitor the received signal strength to determine the direction of the base stations 210a-210e.

The base stations 210a-210e are coupled to one or more of the sensors 205a-205f and one or more of the recorder interfaces 215a-215b. The base stations 210a-210e receive the signals generated by the sensors 205a-205f and transmit them to the recorder interfaces 215a-215b. The base stations 210a-210e may be coupled to the recorder interfaces 215a-215b using wireless communication lines 235a or wireline communication links 235b-235e. In a preferred embodiment, the wireless communication link 235a comprises a pair of directional antennas.

In a preferred embodiment, the base stations 210a-210e include a radio transceiver that is at least partially implemented in software. In a preferred embodiment, the software radio-implementation includes the steps of digitizing the final IF using a wide bandwidth A/D converter; but not at a high interval. In particular, the sample interval is selected to meet the Nyquist criterion for the information bandwidth, but not the IF frequency. Thus, because the input signal is bandlimited, the undersampling aliases the IF frequency down to baseband. The final channel filtering, I and Q splitting and demodulation is done completely digitally. In this manner, the radio hardware cost is limited and provides an optimal platform for adaptively changing the channel bandwidth, modulation scheme, and data rates.

In a preferred embodiment, the base stations 210a-210e further include antennas 230a-230e. In a preferred embodiment, one or more of the antennas 230a-230e comprise active antenna arrays or active beamformers. In this manner, the capacity of the communication channels are optimized. In a preferred embodiment, one or more of the antennas 230a-230e comprise steerable antennas. In this manner, deployment of base stations 210 does not require aiming or positioning of the antennas 230a-230e. Instead, in a preferred embodiment, the antennas 230a-230e scan in a 360° sector around the base stations 230a-230e and monitor the received signal strength to determine the direction of the sensors 205a-205f.

The recorder interfaces 215a-215b are coupled to one or more of the base stations 210a-210e and the recorder 220. The recorder interfaces 215a-215b receive the sensor signals from the base stations 210a-210e and transmit the sensor signals to the recorder 220.

The recorder 220 is coupled to the recorder interfaces 215a-215b. The recorder 220 records the sensors signals received from the recorder interfaces 215a-215b.

In a preferred embodiment, the base stations 210a-210e are adapted to receive data signals from one or all of the sensors 205a-205f. In a preferred embodiment, the seismic acquisition system 200 utilizes one or more of the following methods for distributing the communications resources of the system 200: (1) time division, (2) frequency division, (3) code division, (4) space division, and/or (5) polarization division. Furthermore, in a preferred embodiment, the method for distributing the communications resources of the system 200 will be different for each communication link. In a preferred embodiment, the seismic acquisition system 200 utilizes either a combination of time and frequency division or a combination of time and code division. In a preferred embodiment, the frequency range of the wireless transmission is within the 2.4 GHz to 2.4835 GHz band or the VHF band.

Figure 3:
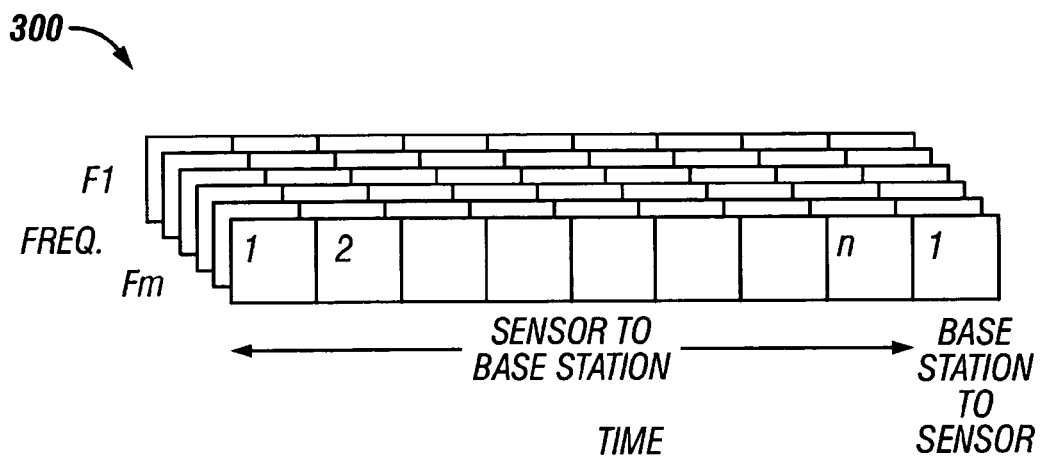
FIG. 3 is a schematic illustration of an embodiment of a time division and frequency division multiplexing system for a seismic acquisition system.

Referring to FIG. 3, in a preferred embodiment, the seismic acquisition system 200 includes communication channels 300 that are divided into M frequency slots and N time intervals. In this manner, the communication channel 300 is divided up using a combination of time division and frequency division.

Using the communication channel 300, during operation of the seismic acquisition system 200, the first sensor transmits data in slot number 1, the second sensor transmits in slot number 2, and so on through sensor N transmitting in time slot M. The reverse link slot is preferably used for transmission of timing and control information to all sensors. In a preferred embodiment, as data rates increase or decrease, the sensors seize multiple time slots as required to support throughput requirements. In a preferred embodiment, the number of time slots per sensor is also dynamically unbalanced. In this manner, the retransmission of erred samples is optimized.

In a preferred embodiment, the communication channel 300 is divided up between uplink and downlink using time division duplex. In this manner, variations in the amount of information that travels to or from the sensors can be dynamically adjusted by the system 200.

In an alternative embodiment, the communication channel 300 is divided up using a combination of time division and code division. In this alternative embodiment, the spreading bandwidth preferably is equal to the total occupied bandwidth of $F_1$ through $F_M$.

In an alternative embodiment, a combination of code and frequency division is used in order to fully utilize the allocated frequency band.

Figure 4:
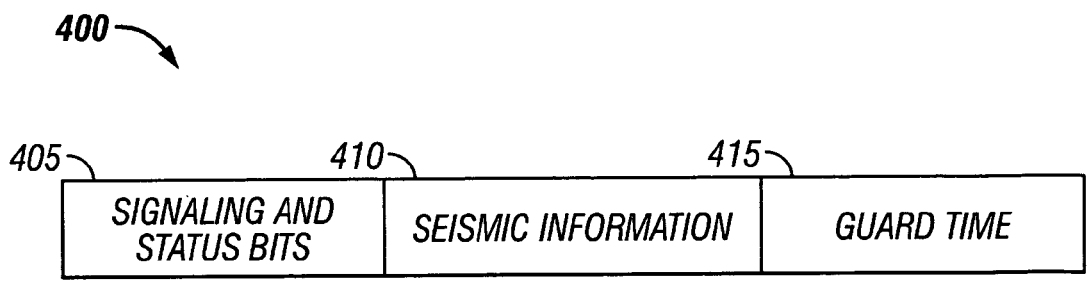
FIG. 4 is a schematic illustration of a time slot for use in a time division multiplexing system for a seismic acquisition system.

Referring to FIG. 4, in a preferred embodiment, the seismic acquisition system 200 includes time slots 400 that include signaling and status bits 405, seismic information 410, and guard time 415. In this manner, the time slot 400 includes both seismic data and signaling and status bits.

Figure 5:
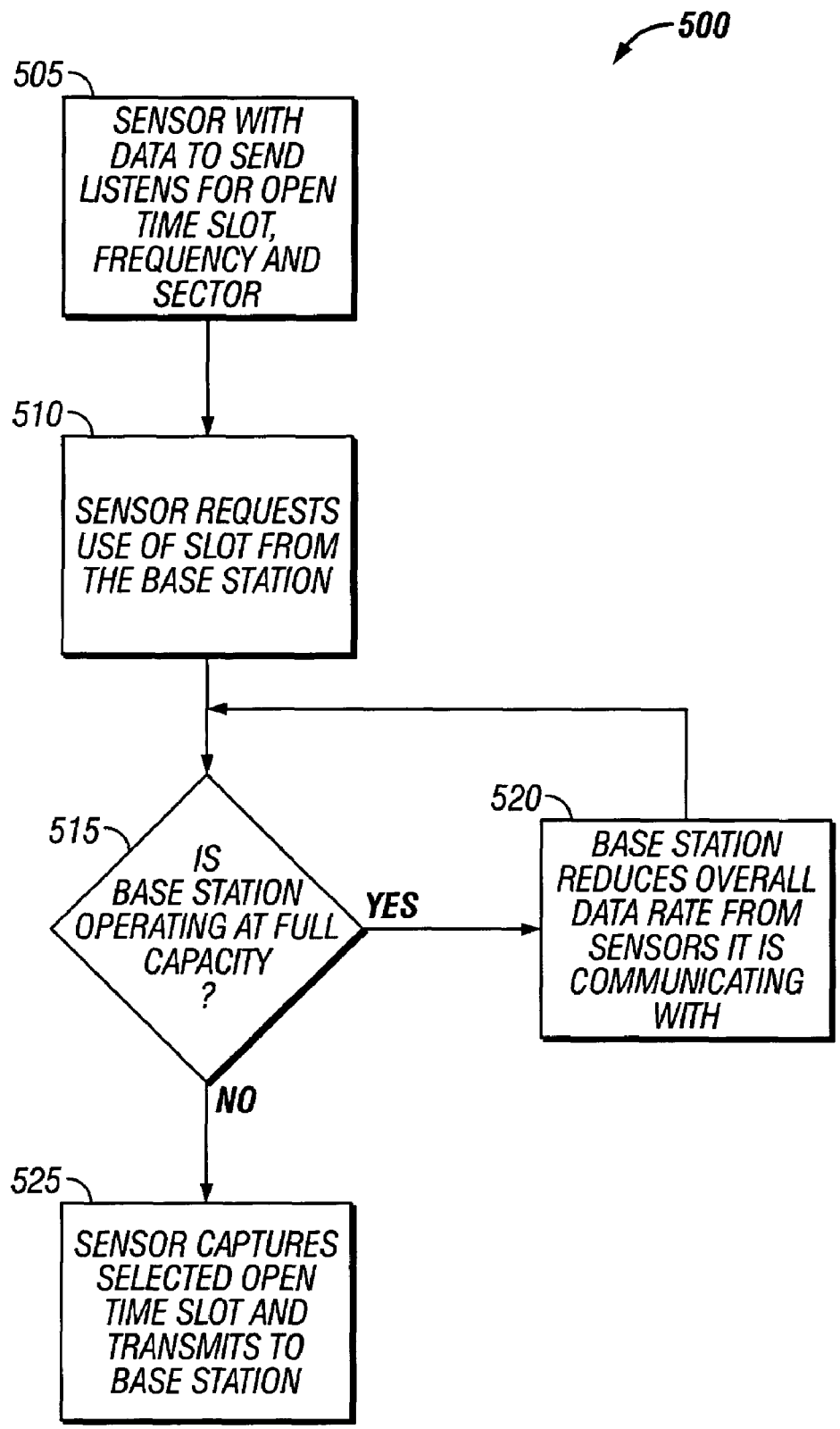
FIG. 5 is a flow chart illustration of an embodiment of a method of transmitting data from a sensor to a base station.

In a preferred embodiment, the determination of channel assignment, time slot and frequency is determined and controlled by the sensors 205. In a preferred embodiment, as illustrated in FIG. 5, the determination of channel assignment, time slot and frequency is coordinated through an initialization program 500 executed by the base stations 210 and the sensors 205.

In program step 505, a sensor 205 with data to send listens for an open time slot, frequency and sector. Once the sensor 205 locates an open time slot, the sensor 205 requests use of the slot from the base station 210 in program step 510. If the base station 210 is already operating at full capacity, the base station 210 may reduce the overall data rate from the sensors 205 that the base station is already communicating with in program steps 515 and 520. If the base station 210 is not already operating at full capacity, then the sensor 205 captures the open time slot and transmits to the base station 210 in program steps 515 and 525.

In a preferred embodiment, during operation of the seismic acquisition system 200, errors in transmission are corrected by coding and/or retransmission. In a particularly preferred embodiment; during operation of the seismic acquisition system 200, errors in transmission are corrected by retransmission.

Figure 6:
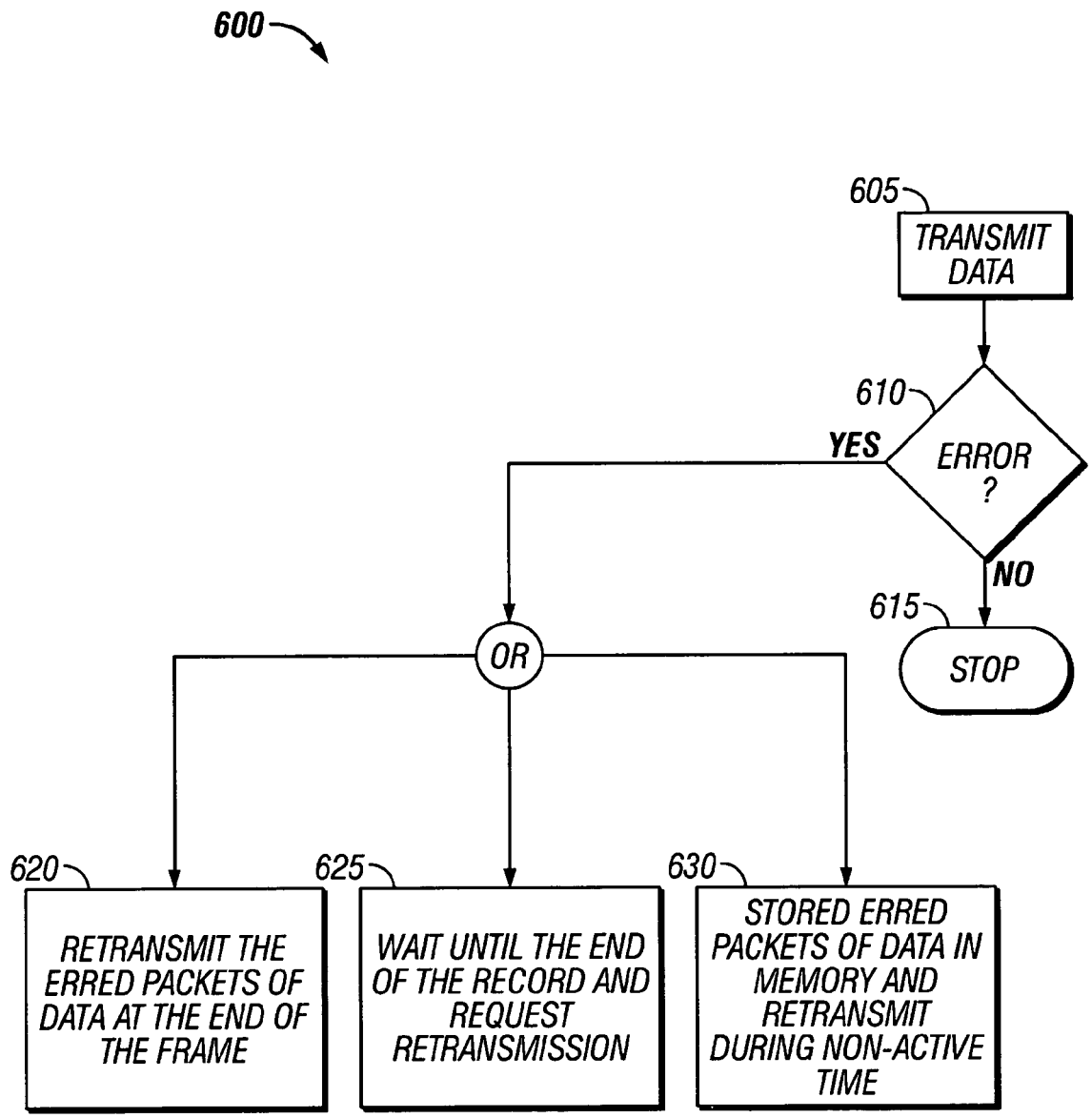
FIG. 6 is a flow chart illustration of an embodiment of a method of correcting errors in transmitted data.

In a preferred embodiment, as illustrated in FIG. 6, during operation of the seismic acquisition system 200, errors in transmission are corrected by a retransmission program 600. In particular, after the transmission of data in step 605, the system 100 checks for errors in transmission in step 610. If no errors in transmission are detected, then the transmission ends in step 615. If errors in transmission are detected in step 610, then the system 100 implements one of the following methods of retransmission: (1) at the end of the frame, retransmit the samples that contained the errors in step 620; (2) wait until the end of the record and then request retransmission in step 625; or (3) store the erred packets of data and later retrieve them in non-active time for retransmission in step 630.

Figure 7:
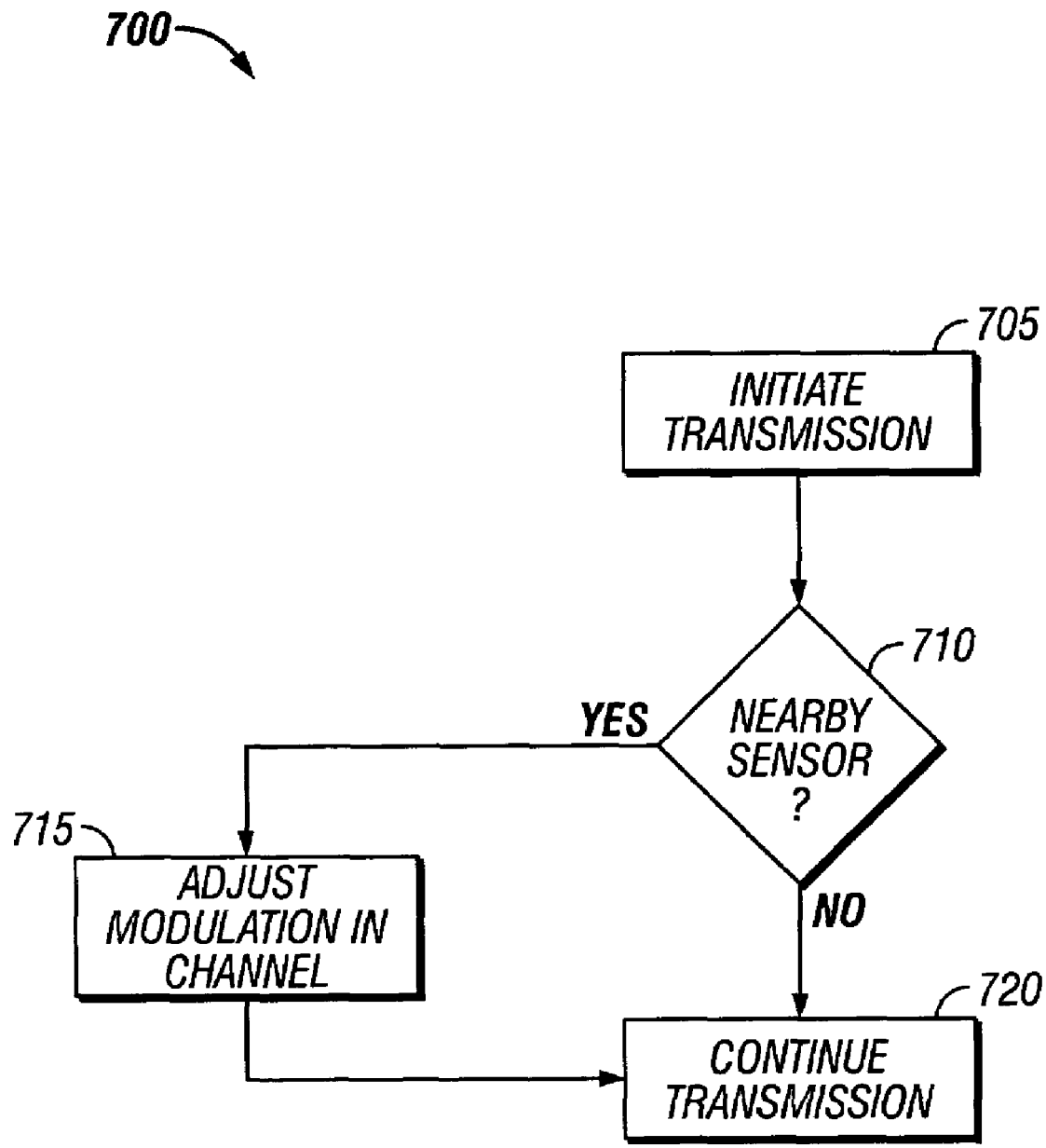
FIG. 7 is a flow chart illustration of an embodiment of a method of adjusting the modulation scheme in a communication channel.

In a preferred embodiment, as illustrated in FIG. 7, the system 100 implements a rate adaptive modulation program 700 in order to optimize the overall system data density. In particular, in step 705, the system initiates the transmission between the base station 210 and a sensor 205. If the sensor 205 is a nearby sensor, then the modulation method is adjusted in steps 710, 715 and 720 to provide more data during transmission. For example, adjusting the modulation scheme from QPSK to 16-QAM. If the sensor 205 is not a nearby sensor, then the transmission continues in steps 710 and 720. In this manner, the modulation is adapted, based upon the location of the sensor 205, to optimize the system data density.

Figure 8A:
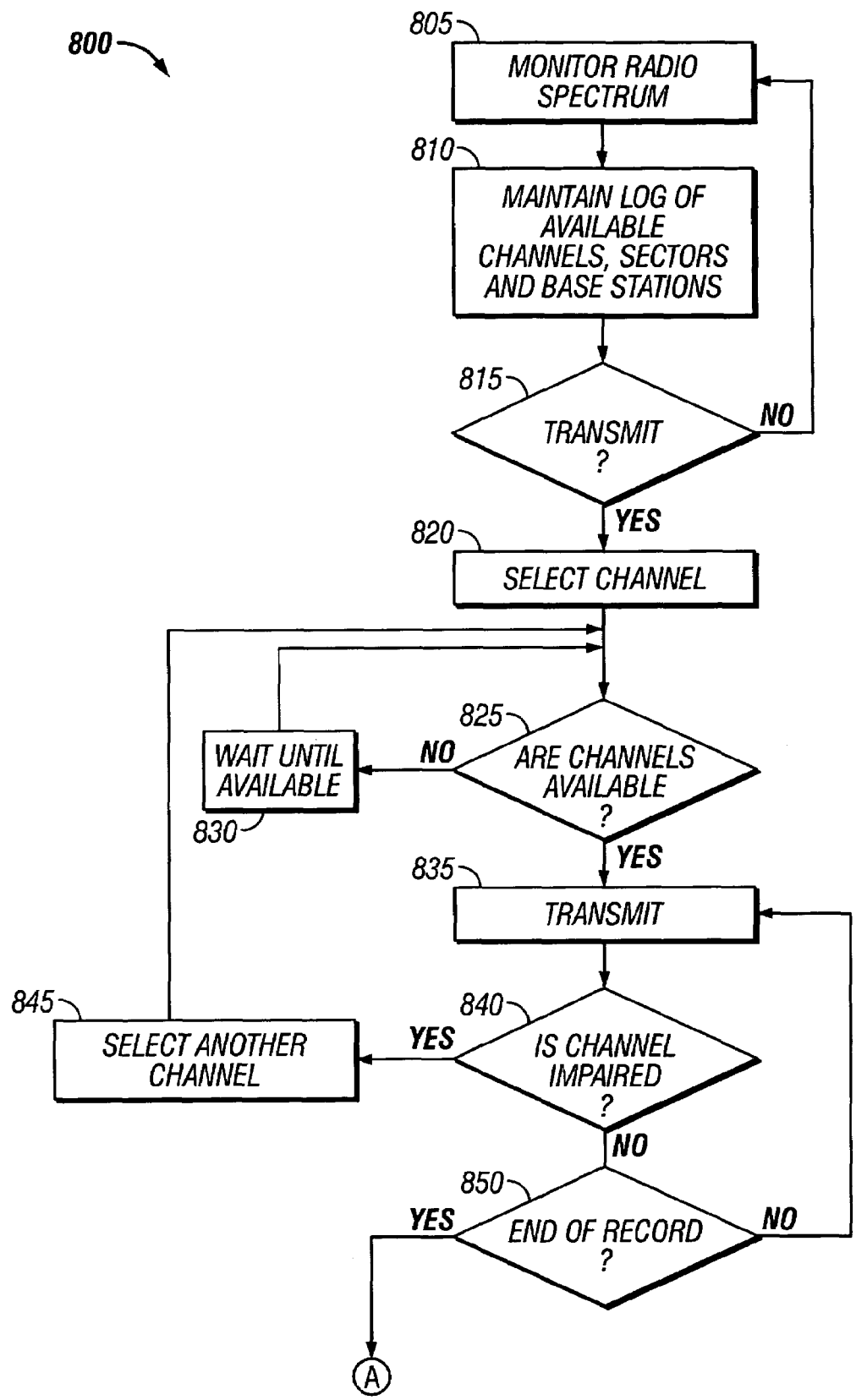
FIGS. 8a and 8b are a flow chart illustration of a method communicating in a seismic acquisition system.
Figure 8B:
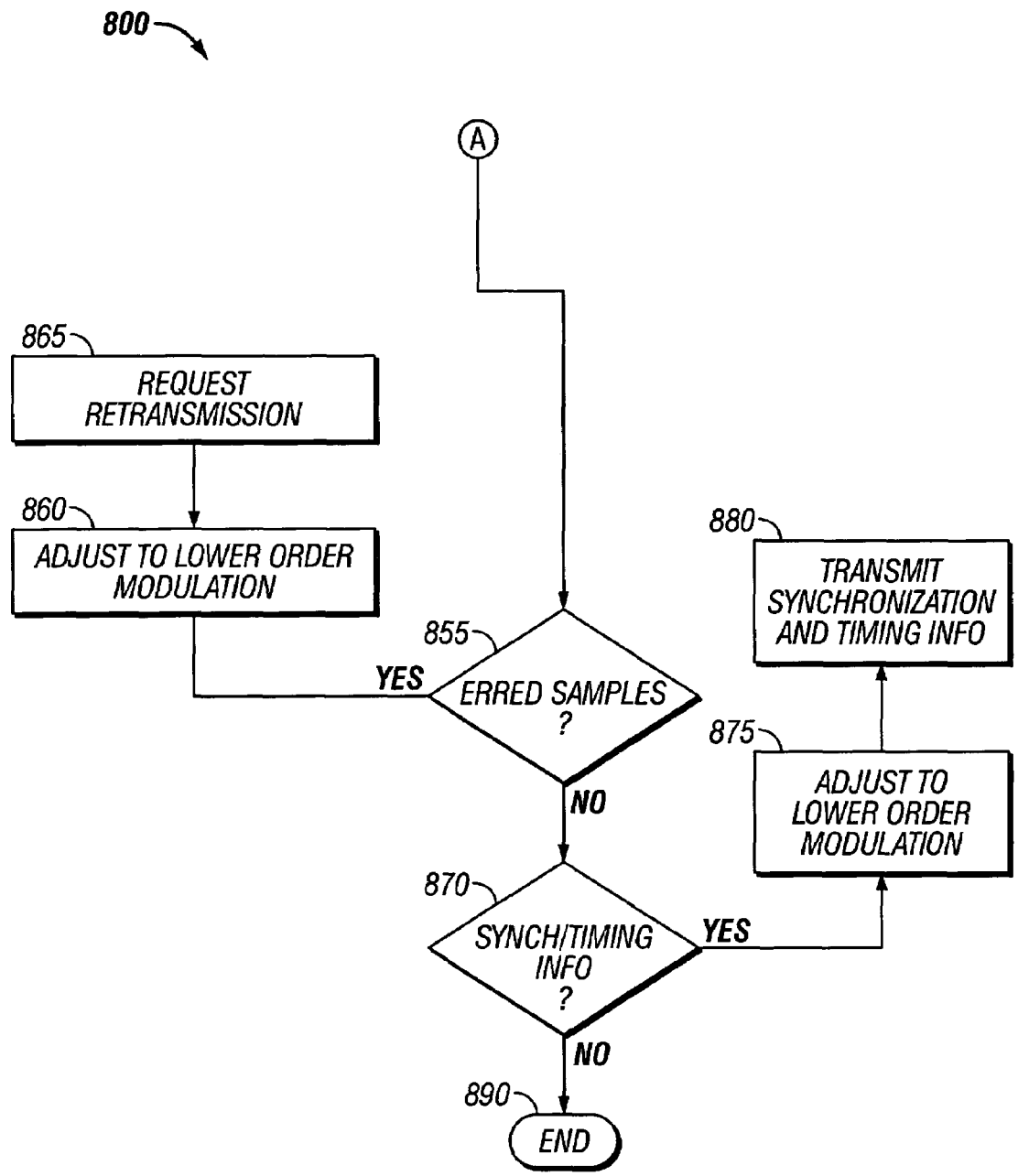

In a preferred embodiment, during operation of the system 200, as illustrated in FIGS. 8a-8b, the system 200 implements a communication program 800 in order to optimize the transfer of data from the sensors 205 to the base stations 210. The sensors 205 continuously monitor the radio spectrum and maintain a log of the available channels, sectors and base stations in steps 805 and 810. Once, the sensors 205 have data to transmit, the sensors 205 then select a channel for transmission in steps 815 and 820. In a preferred embodiment, the channel selected in step 820 is preferably a channel between the sensors 205 and the closest available base station 210. In step 825, the sensors 205 determine if the selected channel is available. If the selected channel is not available, then the sensor waits until it is available in steps 825 and 830. If the selected channel is available, then the sensors 205 transmit to the selected base station 210 in step 835. During transmission, if the selected channel becomes impaired, then the sensors 205 select another available channel in steps 840 and 845. If the selected channel is not impaired and the end of the data record has not been reached, then the sensors 205 continue with transmission in steps 850 and 835. Once the end of the data record is reached, the base station 210 determines if any erred data samples have been transmitted in steps 850 and 855. If erred data samples have been transmitted, then the base station 210 adjusts to a lower order modulation level and requests retransmission of the erred data samples in steps 855, 860 and 865. If no erred data samples were transmitted and the base station 210 has synchronization and/or timing information to transmit, then the base station 210 adjusts to a lower order modulation level and transmits the synchronization and/or timing information in steps 870, 875 and 880. If no erred data samples were transmitted and the base station 210 does not have synchronization and/or timing information to transmit, then the transmission ends in steps 870 and 890.

In a preferred embodiment, the synchronization and timing information transmitted from the base station 210 to the sensors 205 in four time slots that are allocated to the downlink in each frame. In a preferred embodiment, broadcast information is sent on the same channel for all of the sensors 205 or, alternatively, individually addressed messages are sent on separate channels. In a preferred embodiment, the same operating frequency is used for the uplink and downlink in order to optimally provide a duplex communication path.

Figure 9:
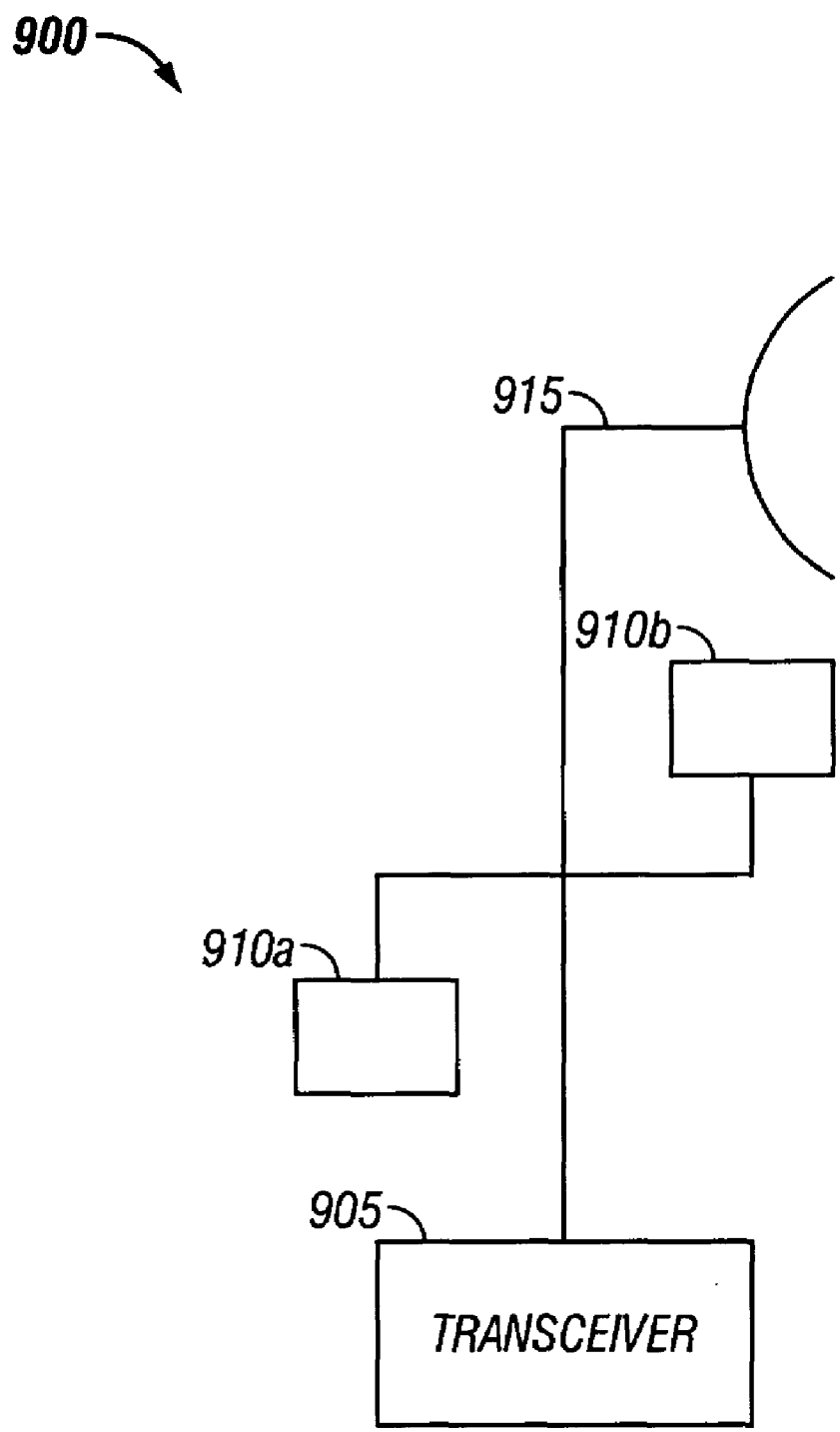
FIG. 9 is a schematic illustration of an embodiment of a base station.

Referring to FIG. 9, a preferred embodiment of a base station 900 for use in the seismic acquisition system 200 will now be described. As illustrated in FIG. 9, the base station 900 preferably includes a transceiver 905, a plurality of diversity antennas 910a and 910b, and a microwave antenna 915. In a preferred embodiment, the base station 900 includes 6 to 12 sectors. In a preferred embodiment, the communication path provided by the microwave antenna 915 is backed up by a wireline connection. In a preferred embodiment, the beamwidth of the diversity antennas 910 are selected such that 100% overlap is provided between adjacent sectors. In this manner, optimum coverage redundancy, capacity and reliability are provided. In a preferred embodiment, the base station 900 dynamically allocates data capacity from lightly used sectors to heavily loaded sectors. In this manner, the transmission of data is optimized.

Figure 10:
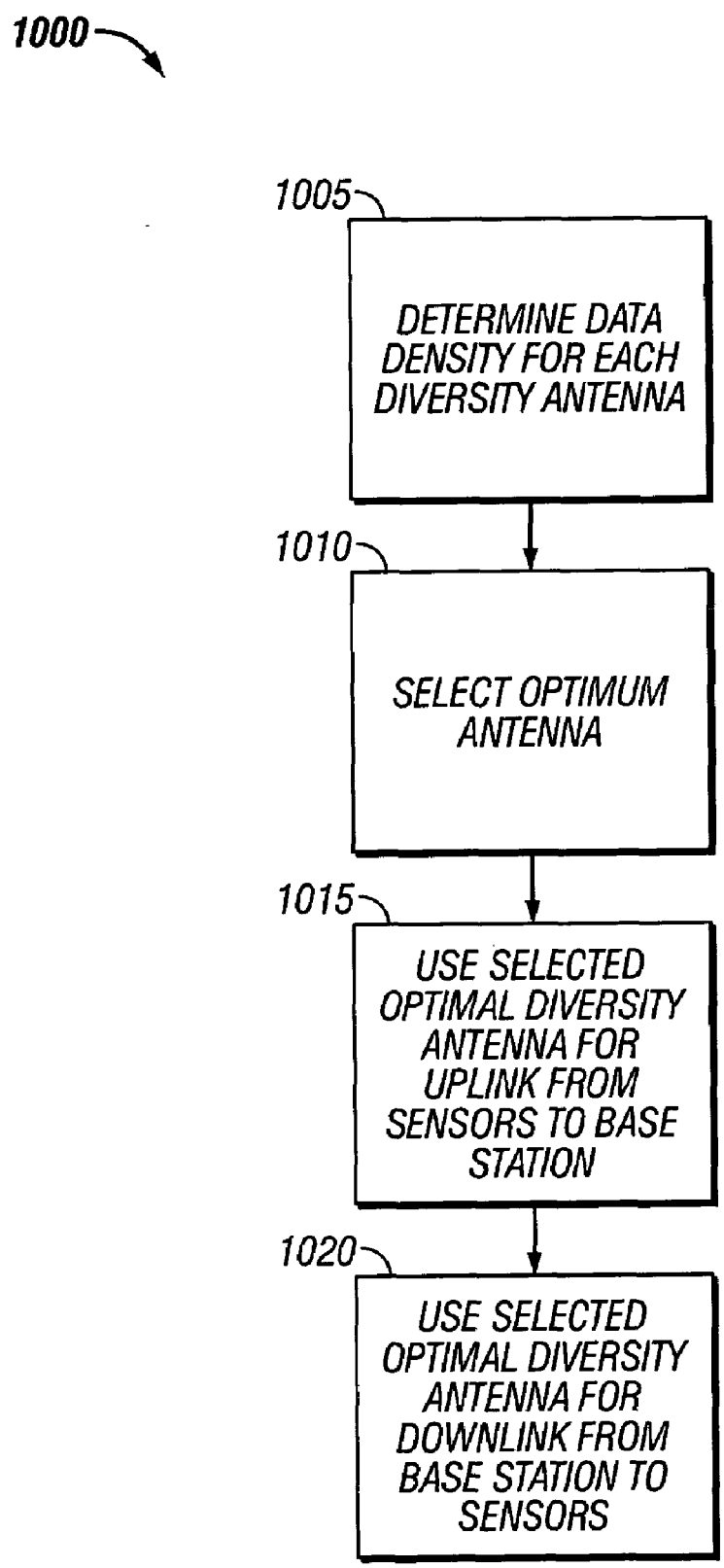
FIG. 10 is a flow chart illustration of an embodiment of a method for selecting an antenna for communications in a seismic acquisition system.

In a preferred embodiment, as illustrated in FIG. 10, during an uplink transmission from the base station 900 to a sensor 205, the base station 900 executes an antenna selection program 1000 to determine the optimum diversity antenna 910 for transmission. During an uplink transmission from the sensors 205 to the base station 900, the base station determines the data density for each diversity antenna 910 in step 1005. The base station 900 then selects the optimum diversity antenna 910 for continued transmission in steps 1010 and 1015. Once the uplink transmission has ended, the base station 900 then uses the selected optimal diversity antenna for the downlink transmission from the base station 900 to the sensors 205 in step 1020. In this manner, the base station 900 uses the optimum diversity antenna 910 for the uplink and downlink transmissions. In a preferred embodiment, the program 1000 is repeated for every sensor 205.

Figure 11:
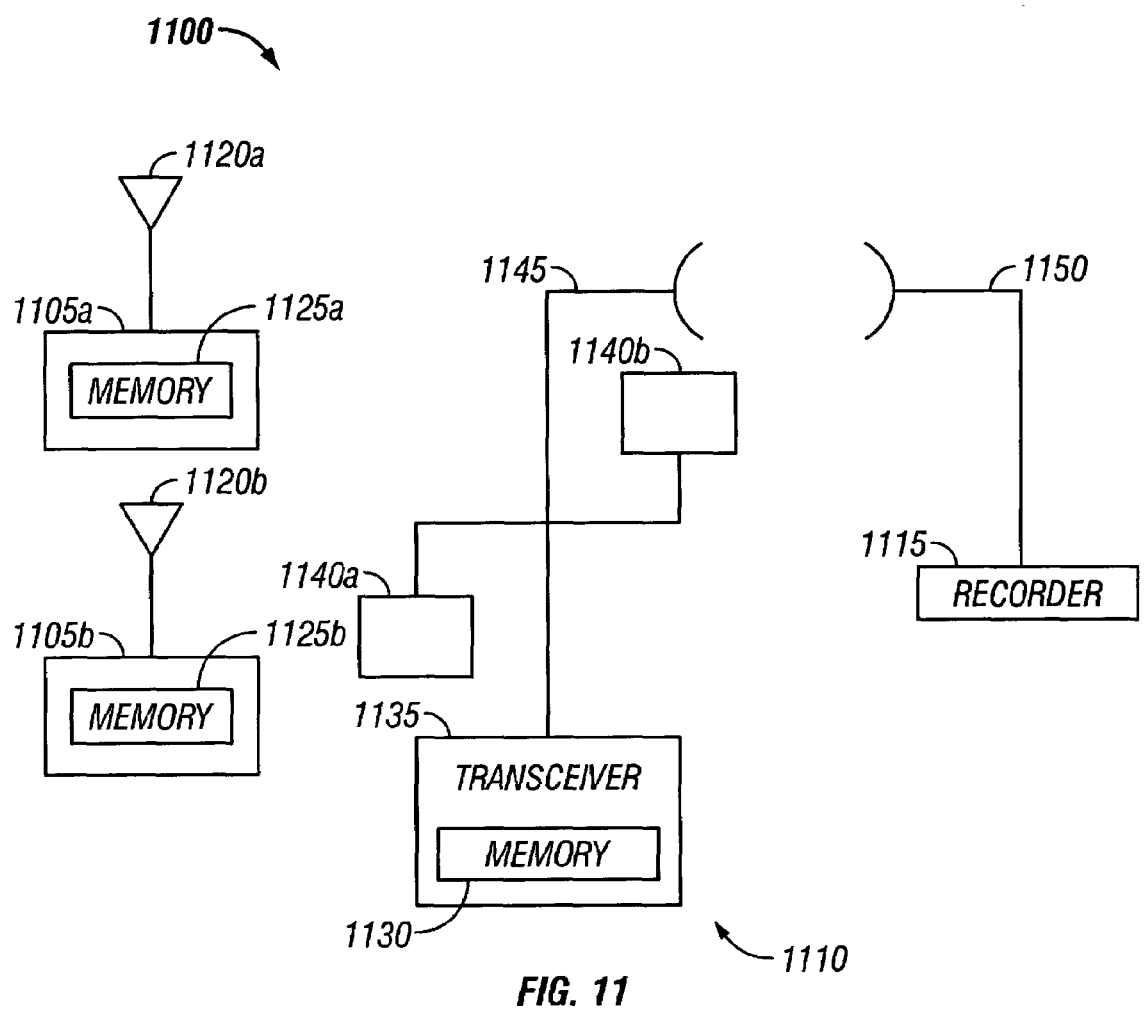
FIG. 11 is a schematic illustration of an embodiment of a seismic acquisition system with distributed data storage.

In a preferred embodiment, as illustrated in FIG. 11, a seismic acquisition system 1100 includes one or more sensors 1105, one or more base stations 1110, and a recorder 1115.

The sensors 1105 include antennas 1120 and memory 1125. In this manner, the sensors 1105 store and transmit seismic data to the base station 1110.

The base station 1110 includes a memory 1130, a transceiver 1135, diversity antennas 1140, and a microwave antenna 1145. In this manner, the base station 1110 stores and transmits seismic data to the recorder 1115.

The recorder 1115 includes a microwave antenna 1150. In a preferred embodiment, the communication link between the base station 1110 and the recorder 1115 is provided by the microwave antennas 1145 and 1150. Alternatively, a wireline connection may be substituted for, or used to back up, the microwave communication link.

In a preferred embodiment, when live data is not being acquired, the sensors 1105 transmit previously recorded data to the base station 1110. In a preferred embodiment, the base station 1110 is adapted to transmit live data and/or previously recorded data to the recorder 1115. In an alternative embodiment, all data storage is provided in the base station 1110 with quality control and status data only being transmitted to the recorder 1115.

Figure 12:
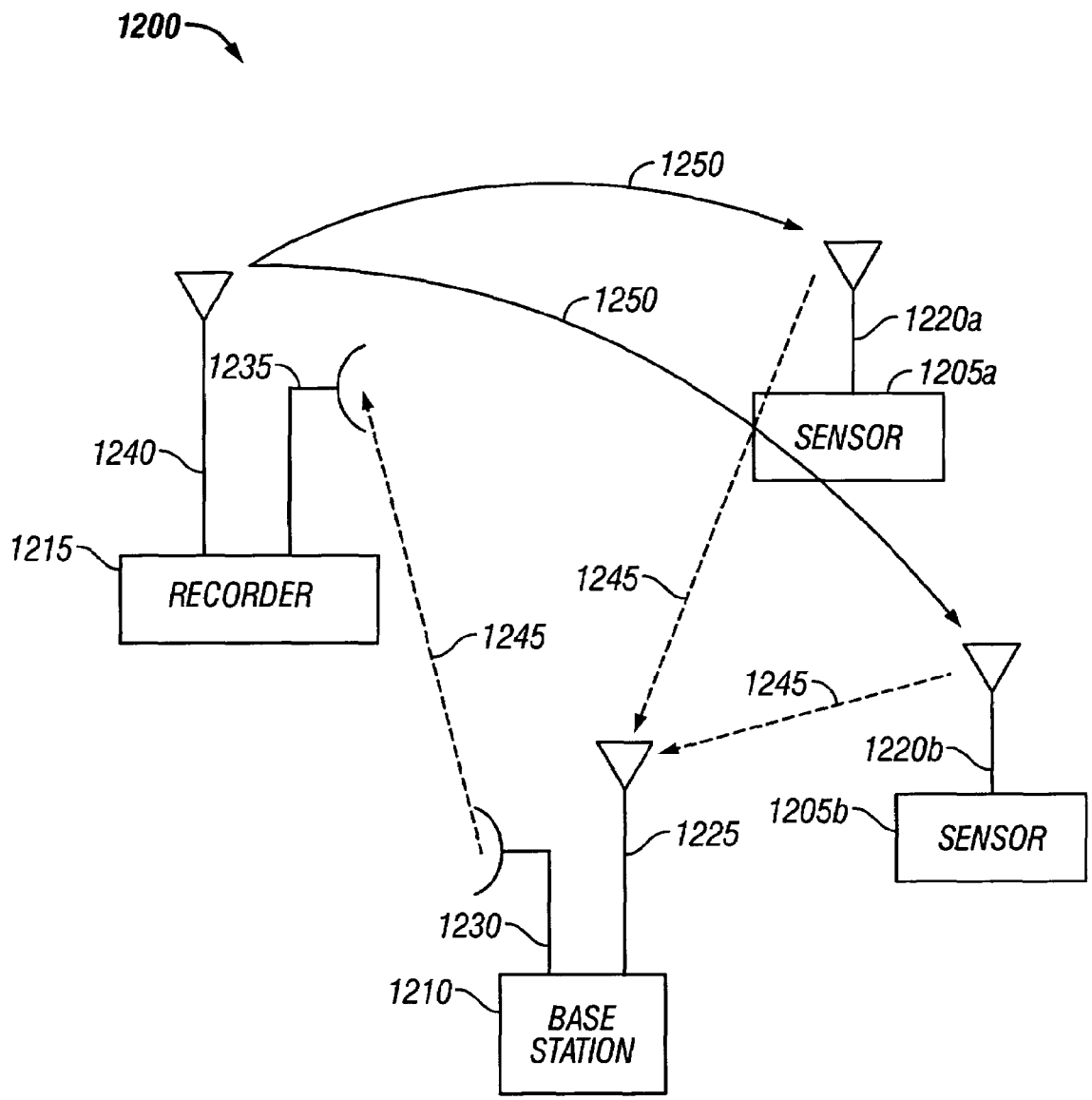
FIG. 12 is a schematic illustration of an embodiment of a seismic acquisition system.

Referring to FIG. 12, an embodiment of a seismic acquisition system 1200 includes one or more sensors 1205, one or more base stations 1210, and a recorder 1215.

The sensors 1205 are operably coupled to the base station 1210. The sensors include antennas 1220.

The base station 1210 is operably coupled to the recorder 1215. The base station 1210 includes one or more diversity antennas 1225 and a microwave antenna 1230.

The recorder 1215 is operably coupled to the base station 1210. The recorder 1215 includes a microwave antenna 1235 and one or more diversity antennas 1240.

In a preferred embodiment, data transmissions 1245 are transmitted in uplinks from the sensors 1205 to the base station 1210, and from the base station 1210 to the recorder 1215. In a preferred embodiment, commands 1250 are transmitted in downlinks from the recorder 1215 to the sensors 1205. In a preferred embodiment, the communication link from the recorder 1215 to the sensors 1205 is a dedicated communication channel. In a preferred embodiment, the communication link from the recorder 1215 to the sensors 1205 is used to synchronize the sensors 1205 to a master time clock for the system 1200. In a preferred embodiment, the master time clock for the system 1200 is synchronized with a global position system time signal.

Figure 13:
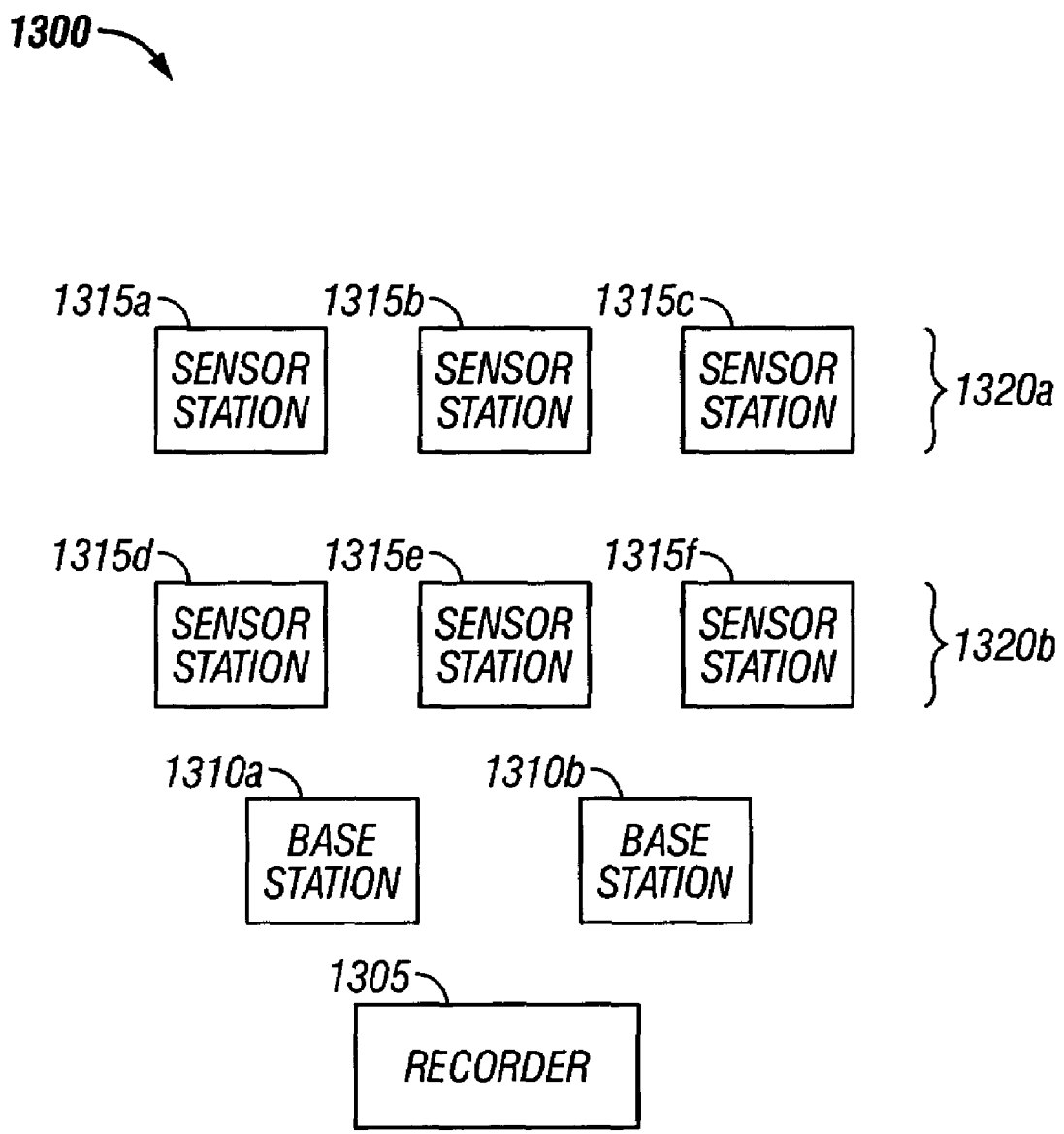
FIG. 13 is a schematic illustration of an embodiment of a seismic acquisition system.

Referring to FIG. 13, an embodiment of a seismic acquisition system 1300 will now be described. In a preferred embodiment, the system 1300 includes a recorder 1305, one or more base stations 1310, and a plurality of sensor station 1315. In a preferred embodiment, the sensor stations 1315 are arranged in a plurality of rows 1320.

The recorder 1305 is operably coupled to the base stations 1310. In a preferred embodiment, the recorder 1305 monitors and controls the operation of the system 1300. In a preferred embodiment, the communication link between the recorder 1305 and the base stations 1310 comprises a wireless communication link. The recorder 1305 preferably transmits control information to the base stations 1310.

The base stations 1310 are operably coupled to the recorder 1305 and the sensor stations 1315. The communication link between the base stations 1310 and the sensor stations 1315 preferably comprises a wireless communication link. The base stations 1310 preferably transmit data to the recorder 1305 and control information to the sensor stations 1315.

The sensor stations 1315 are operably coupled to the base stations 1310. In a preferred embodiment, the sensor stations 1315 include one or more 3-axis sensors.

In a preferred embodiment, the sensor stations 1315 within a given row are spaced apart by a distance ranging from about 13.8 to 55 feet. In a preferred embodiment, adjacent rows 1320 are spaced apart by a distance ranging from about 440 to 1320 feet. During operation of the system 1300, in a preferred embodiment, only a portion of the sensor stations 1315 are actively recording seismic data.

In a preferred embodiment, the sensor stations 1315 transmit digital data extracted from the 3-axis sensors at each sensor station 1315, and/or control information to the base stations 1310. The base stations 1310 preferably transmit the digital data extracted from the 3-axis sensors at each sensor station 1315 and/or the control information received from the sensor stations 1315 to the recorder 1305.

In a preferred embodiment, the recorder 1305 transits control information to the base stations 1310. The base stations 1310 preferably transmit the control information to the sensor stations 1315.

In a preferred embodiment, the recorder 1305 further transmits audio signals; differential GPS information; and/or pager messages to the sensor stations 1315. In a preferred embodiment, the pager messages are used by maintenance personnel to maintain the sensor stations 1315.

In a preferred embodiment, the transmission of control information; audio signals; differential GPS; and pager messages from the recorder 1305 to the sensor stations 1315 is provided using a 64 kbsp common channel stream from the recorder 1305 to the sensor stations 1315.

In several exemplary embodiments of the system 1300, the following sensor station density is utilized:

| Station Density (# of 3-axis sensor stations per square mile) | | | | | |
|---|---|---|---|---|---|
| | | Sensor station spacing (feet) | | | |
| | | 13.8 | 27.5 | 41.25 | 55.00 |
| Line spacing (feet) | 440 | 4591.3 | 2304.0 | 1536.0 | 1152.0 |
| | 660 | 3060.9 | 1536.0 | 1024.0 | 768.0 |
| | 880 | 2295.7 | 1152.0 | 768.0 | 576.0 |
| | 1320 | 1530.4 | 768.0 | 512.0 | 384.0 |

In an exemplary embodiment, the sensor stations 1315 convert the data from each axis of sensitivity every 2 mS, each axis is represented by a 24 bit sample, and the 3-axis sensors operate continuously. In an exemplary embodiment, the sensor station A/D rate is 500 samples/second; the data rate per sensor station 1315 is 36,000 bps; the error detection overhead per sensor stations 1315 is 3000 bps; the transport protocol overhead rate per sensor station 1315 is 1000 bps; and the transport data rate per sensor station 1315 is 40 kpbs.

In several exemplary embodiments of the system 1300, the data per square mile is:

| Data Density (mbps/square mile) | | | | | |
|---|---|---|---|---|---|
| | | Sensor station spacing (feet) | | | |
| | | 13.8 | 27.5 | 41.25 | 55.00 |
| Line spacing (feet) | 440 | 331.8 | 165.9 | 110.6 | 55.0 |
| | 660 | 221.2 | 165.9 | 110.6 | 82.9 |
| | 880 | 165.9 | 82.9 | 55.3 | 41.5 |
| | 1320 | 110.6 | 55.3 | 36.9 | 27.6 |

In an exemplary embodiment of the system 1300, active array size included the following dimensions: active area length of 2.5 miles; active area width of 5 miles; and active area size of 12.5 square miles.

In several exemplary embodiments of the system 1300, the total data transported from the active are of the array of sensor stations 1315 is:

| Total data transported from active area (Mbps) | | | | | |
|---|---|---|---|---|---|
| | | Sensor station spacing (feet) | | | |
| | | 13.8 | 27.5 | 41.25 | 55.00 |
| Line spacing (feet) | 440 | 2304.0 | 1152.0 | 768.0 | 576.0 |
| | 660 | 1536.0 | 768.0 | 512.0 | 384.0 |
| | 880 | 1152.0 | 576.0 | 384.0 | 288.0 |
| | 1320 | 768.0 | 384.0 | 256.0 | 192.0 |

In a preferred embodiment, the system 1300 utilizes one or more of the following wireline communication links for transporting signals: (1) twisted pair; and/or (2) coaxial cable and/or (3) fiber optic cable. In a preferred embodiment, the system 1300 utilizes a twisted pair communication link that utilizes one or more of the following: (1) asymmetric digital subscriber loop (ADSL); (2) high-speed digital subscriber loop (HDSL); (3) very-high speed digital subscriber loop (VDSL); (4) T1; (5) E1; and/or ISDN-U bus. In a preferred embodiment, the system 1300 utilizes a coaxial cable communication link that utilizes one or more of the following: (1) coaxial version of Ethernet (IEEE 802); (2) T4 carrier; and/or (3) E4 carrier. In a preferred embodiment, the system 1300 utilizes a fiber optic cable communication link that utilizes one or more of the following: (1) FDDI fiber optic network backbone; and/or (2) OC-3 protocol. In a preferred embodiment, the OC-3 protocol is implemented using a monolithic transceiver chipset such as, for example, the PMC Sierra PM5346 and an optical transceiver module such as, for example, the Amp 269039-1.

In a preferred embodiment, the system 1300 utilizes a wireless communication link for transmitting signals that includes a cellular system. In a preferred embodiment, the cellular system used in the system 1300 includes a plurality of picocells having a designated base station 1310 and a plurality of corresponding sensor stations 1315 that communicate exclusively with the designated base station 1310. The designated base stations 1310 in turn communicate with the recorder 1305. In a preferred embodiment, the picocells of the system 1300 utilize one or more of the following methods for implementing a communication channel: (1) frequency division multiple access (FDMA); (2) time division multiple access (TDMA); and/or (3) code division multiple access (CDMA)/direct sequence spread spectrum.

Figure 14:
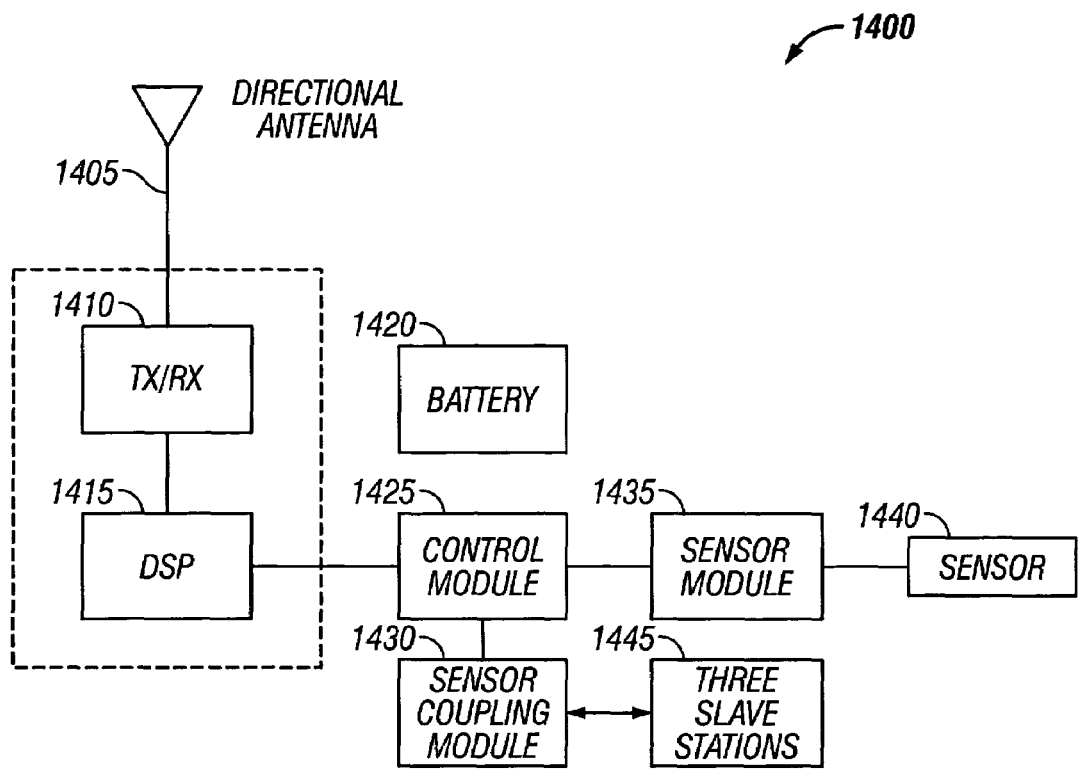
FIG. 14 is a schematic illustration of an embodiment of a wireless master sensor station for use in a seismic acquisition system.
Figure 15:
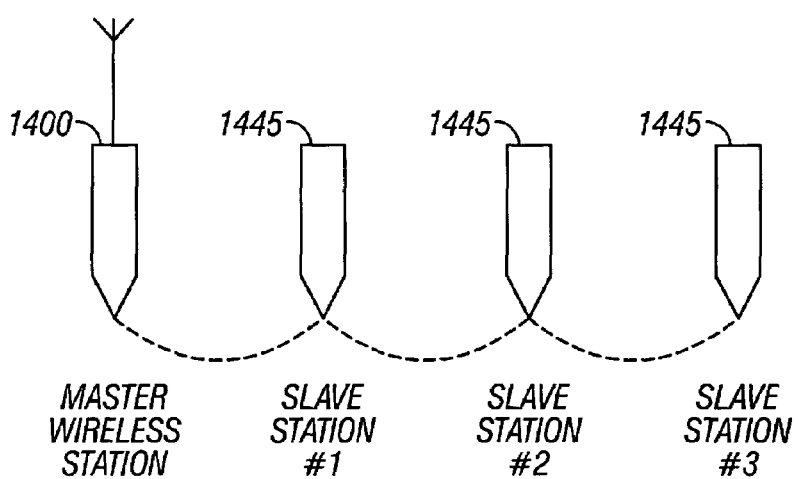
FIG. 15 is a schematic illustration of an embodiment of a master wireless sensor station and one or more slave sensor stations.

Referring to FIGS. 14 and 15, an embodiment of a wireless master sensor station 1400 for use in a seismic acquisition system includes a directional antenna 1405, a transceiver 1410, a digital signal processor 1415, a battery 1420, a control module 1425, a sensor coupling module 1430, a sensor module 1435, and a sensor 1440. In a preferred embodiment, the wireless master station 1400 is operably coupled to one or more slave sensor stations 1445.

In a preferred embodiment, the wireless master sensor station provides one or more of the following functions: (1) house a 3-axis sensor 1440 and the electronic circuitry required to operate the sensor and convert the sensor data into digital form; (2) serve as the master for a group of up to four connected stations, directing the activity of up to three slave sensor stations 1445 and collecting their digital sensor data for transmission to a picocell base station; and (3) receive commands from a picocell base station and transmit the data for all four stations via wireless technology to the associated picocell base station. In a preferred embodiment, the wireless technology comprises cellular technology. In a preferred embodiment, each station, or group of four stations, provides a complete stand along unit with sufficient battery life to operate over the duration from installation to array rotation time.

The directional antenna 1405 is coupled to the transceiver 1410. The directional antenna 1405 may comprise any number of conventional commercially available directional antennas.

The transceiver 1410 is coupled to the directional antenna 1405 and the digital signal processor 1415. The digital signal processor 1415 is coupled to the transceiver 1410 and the control module 1425. In a preferred embodiment, the transceiver 1410 and the digital signal processor 1415 provide a conventional cellular frequency spread spectrum transceiver. In a preferred embodiment, the transceiver 1410 and the digital signal processor 1415 provide direct sequence spread spectrum (DSSS) incorporating QMBOK encoded data in a time division multiplex (TDMA) protocol. In a preferred embodiment, the transceiver 1410 and the digital signal processor 1415 provide data burst transfers at 4.0 Mbps towards a picocell base station and a 64 kbps from the picocell base station.

The battery 1420 is coupled to the remaining elements of the wireless master sensor station 1400. The battery 1420 may comprise any number of conventional commercially available batteries suitable for outdoor conditions.

The control module 1425 is coupled to the digital signal processor 1415, the sensor coupling module 1420 and the sensor module 1435. The control module 1425 is preferably adapted to control the operation of the wireless master sensor station 1400. In a preferred embodiment, the control module 1425 includes a microprocessor for implementing the control functions, for interfacing with the sensor module 1435, coordinating communications with the picocell base station, operating the sensor coupling module 1430, directing the activities of the slave sensor stations 1445, and providing maintenance and diagnostic functions.

The sensor coupling module 1430 is coupled to the control module 1425 and up to three slave sensor station 1445. In a preferred embodiment, the communication interface between the sensor coupling module 1430 and the slave sensor stations 1445 provides a transmission rate of at least 120 kbps.

The sensor module 1435 and sensor 1440 are coupled to the control module 1425. In a preferred embodiment, the sensor module 1435 and sensor 1440 include the sensor interface electronics and a 3-axis sensor. In a preferred embodiment, the sensor module 1435 generates an output signal comprising three 24 bit data words.

The slave sensor stations 1445 are operably coupled to the sensor coupling module 1430. Each slave sensor station 1445 preferably includes one or more 3-axis sensors and generates an output signal representative of the sensed conditions for transmission to the sensor coupling module 1430.

Thus, in a preferred embodiment, the wireless master sensor station 1400 provides a stand alone sensor station capable of receiving command and control data from a nearby picocell base station, directing the operation of up to four attached sensor stations, and transmitting the digital sensor data from all four stations to the picocell base station in real time.

Figure 16:
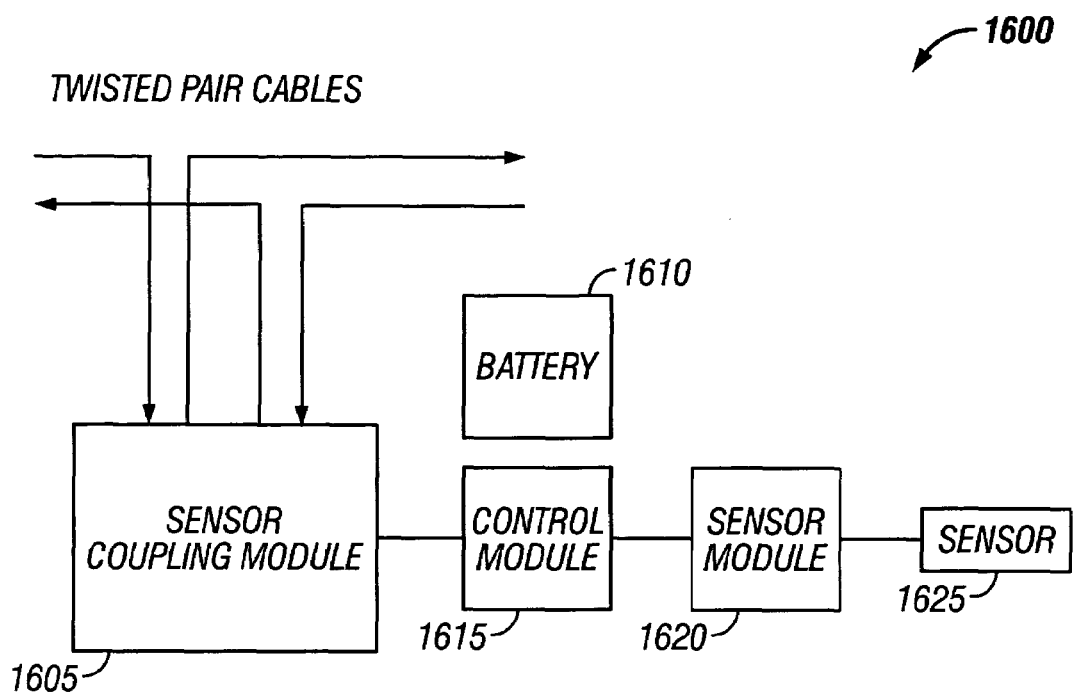
FIG. 16 is a schematic illustration of an embodiment of a twisted pair sensor station for use in a seismic acquisition system.
Figure 17:
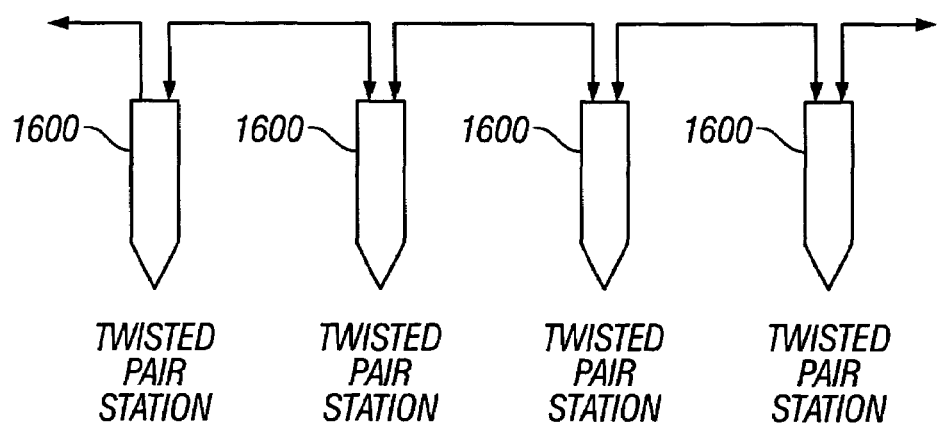
FIG. 17 is a schematic illustration of an embodiment of a twisted pair station and one or more slave stations.

Referring to FIGS. 16 and 17, an embodiment of a twisted pair sensor station 1600 includes a sensor coupling module 1605, a battery 1610, a control module 1615, a sensor module 1620, and a sensor 1625. In a preferred embodiment, the twisted pair sensor station 1600 is coupled to one or more additional twisted pair stations 1600 in daisy-chain fashion. In a preferred embodiment, the twisted pair sensor station 1600 is identical to the wireless master sensor station 1400 described above, except that the cellular radio function is removed and the sensor station coupling interface now becomes a daisy chain element in a line of sensor stations.

The sensor coupling module 1605 is coupled to the control module 1615 and one or more twisted pair cables. In a preferred embodiment, the sensor coupling module 1605 is adapted to communicate with a picocell base stations and one or more additional twisted pair sensor stations 1600 using one or more twisted pair connections. In a preferred embodiment, the sensor coupling module 1605 is coupled to an associated picocell base station using a first twisted pair connection, and the associated picocell base station is coupled to other twisted pair sensor stations 1600 using separate twisted pair connections. In this manner, cable or station damage at any one location would not disable the attached twisted pair sensor stations 1600.

The battery 1610 is coupled to the remaining elements of the twisted pair sensor station 1600. The battery 1610 may comprise any number of conventional commercially available batteries suitable for outdoor conditions.

The control module 1615 is coupled to the sensor module 1620. The control module 1615 is preferably adapted to control the operation of the twisted pair sensor station 1600. In a preferred embodiment, the control module 1615 includes a microprocessor for implementing the control functions, for interfacing with the sensor module 1620, coordinating communications with the picocell base station, operating the sensor coupling module 1605, and providing maintenance and diagnostic functions.

The sensor module 1620 and the sensor 1625 are coupled to the control module 1615. In a preferred embodiment, the sensor module 1620 and the sensor 1625 include the sensor interface electronics and a 3-axis sensor. In a preferred embodiment, the sensor module 1620 generates an output signal comprising three 24 bit data words.

Figure 18:
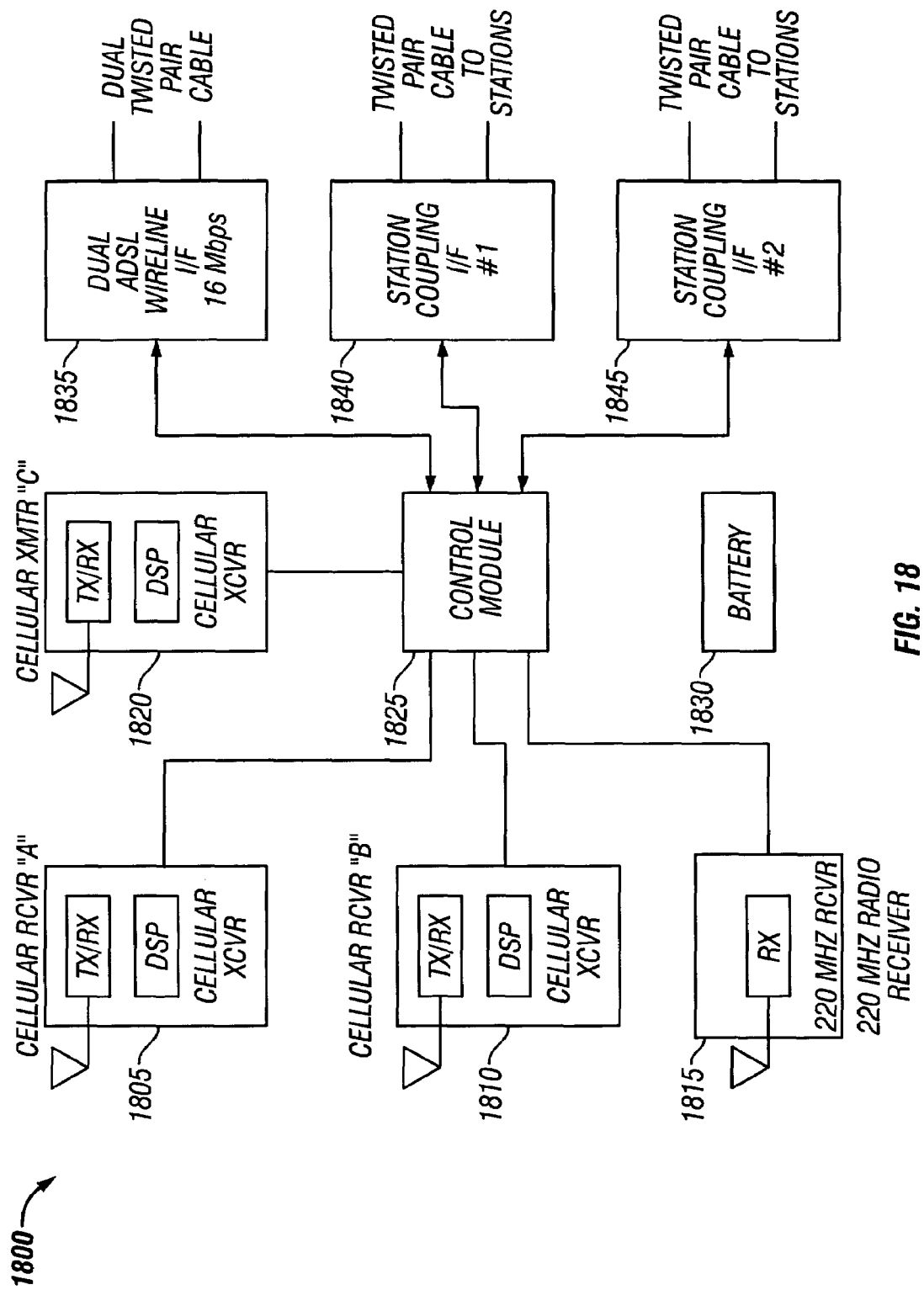
FIG. 18 is a schematic illustration of an embodiment of a picocell base station for use in a seismic acquisition system.

Referring to FIG. 18, an embodiment of a picocell base station 1800 preferably includes a channel A cellular transceiver 1805, a channel B cellular transceiver 1810, a radio receiver 1815, a channel C cellular transceiver 1820, a control module 1825, a battery 1830, a first wireline interface 1835, a second wireline interface 1840, and a third wireline interface 1845. In a preferred embodiment, the picocell base station 1800 is coupled to one or more wireless master sensor stations 1400 and one or more twisted pair sensor stations 1600. In a particularly preferred embodiment, the picocell base station 1800 is coupled to first and second groups of wireless master sensor stations 1400, with each group corresponding to different operating frequencies. In this manner, a cellular picocell is formed.

The channel A cellular transceiver 1805 is operably coupled to the control module 1825. In a preferred embodiment, the channel A cellular transceiver 1805 is further coupled to an associated A group of wireless master sensor stations 1400. In a preferred embodiment, the channel A cellular transceiver 1805 receives seismic data from its associated A group of wireless master sensor stations 1400.

The channel B cellular receiver 1810 is operably coupled to the control module 1825. In a preferred embodiment, the channel B cellular transceiver 1810 is further coupled to an associated B group of wireless master sensor stations 1400. In a preferred embodiment, the channel B cellular transceiver 1810 receives seismic data from its associated B group of wireless master sensor stations 1400.

The radio receiver 1815 is coupled to the control module 1825. In a preferred embodiment, the radio receiver 1815 is further coupled to a controller for a seismic acquisition system. In this manner, the picocell base station unit 1800 receives control information from and transmits diagnostic information to a controller.

The channel C cellular transceiver 1820 is operably coupled to the control module 1825. In a preferred embodiment, the channel C cellular transceiver 1820 is further coupled to the associated A and B group of wireless master sensor stations 1400. In a preferred embodiment, the channel C cellular transceiver 1820 transmits control information to the associated A and B group of wireless master sensor stations 1400.

The control module 1825 is coupled to the remaining elements of the picocell base station 1800. In a preferred embodiment, the control module 1825 is adapted to control the operation of the picocell base station 1800.

The battery 1830 is coupled to the remaining elements of the picocell base station 1800. The battery 1830 may comprise any number of conventional commercially available batteries suitable for outdoor use.

The first wireline interface 1835 is preferably coupled to a high data rate hierarchical multiplexer system. In a preferred embodiment, the multiplexer system in turn transmits the received data to a seismic system controller in real time. In a preferred embodiment, the first wireline interface 1835 comprises a dual ADSL twisted pair cable interface.

The second wireline interface 1840 is preferably coupled to one or more twisted pair sensor stations 1600. In a preferred embodiment, the second wireline interface 1840 comprises a twisted pair wireline interface. The third wireline interface 1845 is preferably coupled to one or more twisted pair sensor stations 1600. In a preferred embodiment, the third wireline interface 1845 comprises a twisted pair wireline interface.

Figure 19:
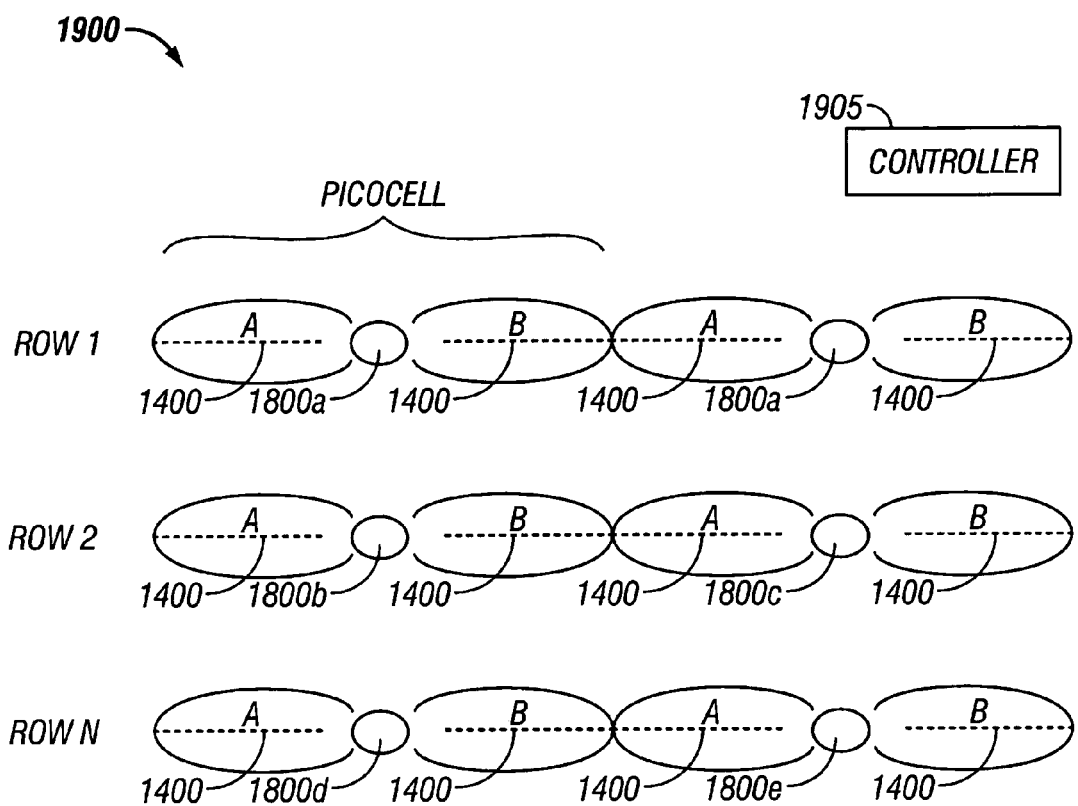
FIG. 19 is a schematic illustration of an embodiment of a seismic accusation system including a plurality of pico cells.

Referring to FIG. 19, an embodiment of a seismic acquisition system 1900 will now be described. In a preferred embodiment, the system 1900 includes a plurality of pico cell base stations 1800, associated groups of wireless master sensor stations 1400 positioned in N rows, and a system controller 1905. In a preferred embodiment, each pico cell base station 1800 is coupled to corresponding A and B groups of wireless sensor stations 1400 positioned proximate each picocell base station 1205. In this manner, a cellular pico cell including a picocell base station 1800 and A and B groups of wireless master sensor stations 1400 is provided. Furthermore, in a preferred embodiment, each picocell base station 1800 is coupled to the system controller 1905 using a wireless communication link. In this manner, system controller 1905 monitors and controls the operation of the cellular picocells.

In a preferred embodiment, the A group of wireless master sensor stations 1400 is coupled to the cellular channel A transceiver 1805 of the associated picocell base station 1800. In a preferred embodiment, the cellular channel A transceiver 1805 includes a directional antenna whose area of coverage includes the A group of wireless master sensor stations 1400. In a preferred embodiment, the directional antenna has good side lobe suppression in order to optimally minimize with interference with adjacent cellular picocells. In this manner, data is transmitted from the A group of wireless master sensor stations 1400 to the associated picocell base station 1800.

In a preferred embodiment, the B group of wireless master sensor stations 1400 is coupled to the cellular channel B transceiver 1810 of the associated picocell base station 1800. In a preferred embodiment, the cellular channel A transceiver 1810 includes a directional antenna whose area of coverage includes the B group of wireless master sensor stations 1400. In a preferred embodiment, the directional antenna has good side lobe suppression in order to optimally minimize with interference with adjacent cellular picocells. In this manner, data is transmitted from the B group of wireless master sensor stations 1400 to the associated picocell base station 1800.

In a preferred embodiment, the A and B group of wireless master sensor stations 1400 are coupled to the cellular channel C transceiver 1820 of the associated picocell base station 1800. In a preferred embodiment, the cellular channel C transceiver 1820 includes a directional antenna whose area of coverage includes the A and B group of wireless master sensor stations 1400. In a preferred embodiment, the directional antenna has good side lobe suppression in order to optimally minimize with interference with adjacent cellular picocells. In this manner, control information is transmitted picocell base station 1800 to the associated A and B groups of wireless master sensor stations 1400.

In a preferred embodiment, each cellular picocell includes a picocell base station 1800 and 80 wireless master sensor stations 1400 in each of groups A and B. In this manner, a cellular picocell is provided that services 160 wireless master sensor stations 1400. In a preferred embodiment, the directional antenna 1405 has good side lobe suppression in order to optimally minimize with interference with adjacent cellular picocells. In a preferred embodiment, each picocell base station 1800 communicates with first and second groups of wireless master sensor stations 1400 positioned on opposite sides of the picocell base station 1800.

In a preferred embodiment, each picocell base station 1800 includes A and B operating frequencies that correspond to the cellular channel A and B transceivers, 1805 and 1810. The A and B operating frequencies along with the directional antennas preferably provided for the cellular channel A and B transceivers, 1805 and 1810, optimally provide up to 160 wireless master sensor stations 1400 access to each picocell base station 1800. In a preferred embodiment, the center frequencies lies at the upper end and the lower end of the 2.4 GHz ISM frequency band. In a preferred embodiment, the picocell base stations 1800 utilize CDMA. In a preferred embodiment, the spreading bandwidth used is 22 MHZ. In a preferred embodiment, the picocell base stations 1800 utilize Quaternary M-ary Bi-Orthogonal Keying (QMBOK) as the modulation method. In a preferred embodiment, the picocell base stations 1800 provide a 5.5 Mbps data transmission rate from each of the wireless master sensor stations 1400. In a preferred embodiment, the chip set utilized for implementing the RF portion of the transceivers, 1805, 1810 and 1820, is the Harris Prism chip set that utilizes direct sequence spread spectrum technology.

In a preferred embodiment, the radio transceiver 1815 of each picocell base station 1800 is operably coupled to the system controller 1905 using a wireless link. In a preferred embodiment, the wireless link utilizes CDMA in the 2.4 GHz ISM band. In a preferred embodiment, the radio transceiver 1815 and the system controller 105 include vertically polarized antennas. In a preferred embodiment, this communication link supports dual 4.0 Mbps data rates.

In an alternative embodiment, a portion of the wireless master sensor stations 1400 of the system 1900 are replaced with twisted pair sensor stations 1600. In this alternative embodiment, the twisted pair sensor stations 1600 are coupled to the controller 1905 using a wireline twisted pair communication link.

In an alternative embodiment, the system 1900 utilizes TDMA for wireless communication within the cellular picocells. In a preferred embodiment, the implementation includes a combination of TDMA and DSSS. As illustrated in 20, in a preferred embodiment, the available data transmission time is divided up into a predetermined number of time slots, with a times lot allocated to each wireless master sensor station 1400. In a preferred embodiment, the number of time slots provides for: (1) the transmission of data from up to 80 group A wireless master sensor stations to the associated picocell base station 1800 on channel A; (2) the transmission of data from up to 80 group B wireless master sensor stations to the associated picocell base station 1800 on channel B; and (3) the transmission of control information from the picocell base station 1800 to the associated groups A and B of wireless master sensor stations 1400.

Figure 20:
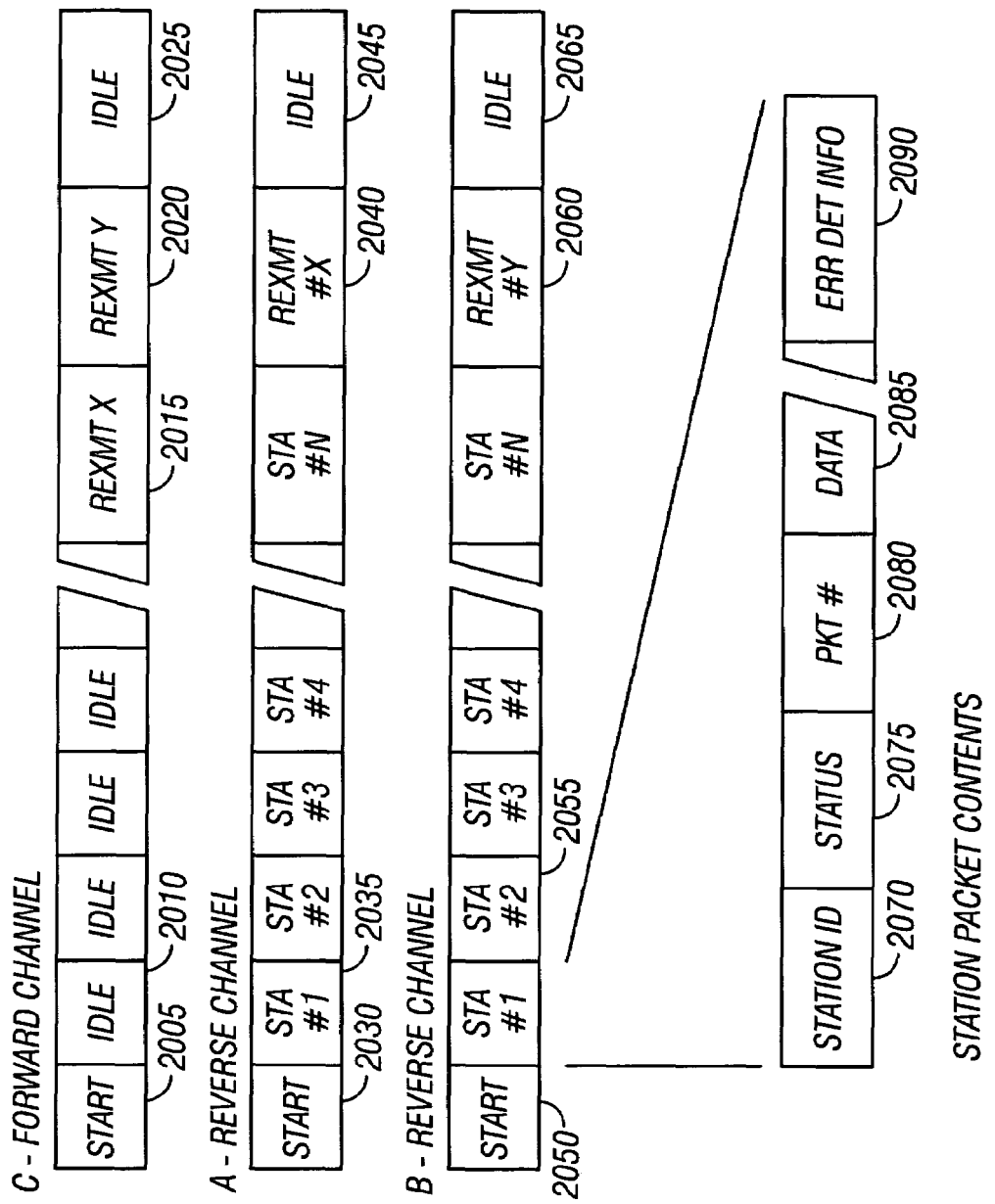
FIG. 20 is a schematic illustration of an embodiment of a time division multiplexing system for use in a seismic acquisition system.

As illustrated in FIG. 20, the forward channel C preferably includes a START time slot 2005 for initialization, one or more IDLE time slots 2010 during the transmission of data from the wireless master sensor stations 1400 to the picocell base station 1800, one or more REXMT X time slots 2015 for requesting the retransmission of data from one or more of the wireless master sensor stations 1400 in the group A to the picocell base station 1800, one or more REXMT Y time slots 2020 for requesting the retransmission of data from one or more of the wireless master sensor stations 1400 in the group B to the picocell base station 1800, and IDLE time slots 2025 at the end of a communication sequence.

As illustrated in FIG. 20, the reverse channel A preferably includes a START time slot 2030 for initialization, one or more STA #N time slots 2035 for transmitting data from the Nth wireless master sensor station 1400 in group A to the picocell base station 1800, one or more REXMT X time slots 2040 for retransmitting data from one or more of the wireless master sensor stations 1400 in group A to the picocell base station 1800, and IDLE time slots 2045 at the end of a communication sequence.

As illustrated in FIG. 20, the reverse channel B preferably includes a START time slot 2050 for initialization, one or more STA #N time slots 2055 for transmitting data from the Nth wireless master sensor station 1400 in group B to the picocell base station 1800, one or more REXMT Y time slots 2060 for retransmitting data from one or more of the wireless master sensor stations 1400 in group B to the picocell base station 1800, and IDLE time slots 2065 at the end of a communication sequence.

As illustrated in FIG. 20, each of the STA #N time slots, 2035 and 2055, preferably include a STATION ID time slot 2070 for identifying the Nth wireless master sensor station 1400, a STATUS time slot 2075 for providing status information for the Nth wireless master sensor station 1400, a PKT# time slot 2080 for identifying the data packet number, a DATA time slot 2085 for transmitting the data, and an ERR DET INFO time slot 2090 for transmitting error detection information for the data. In a preferred embodiment, a guard time slot is further provided to prevent transmission overlap.

Figure 21:
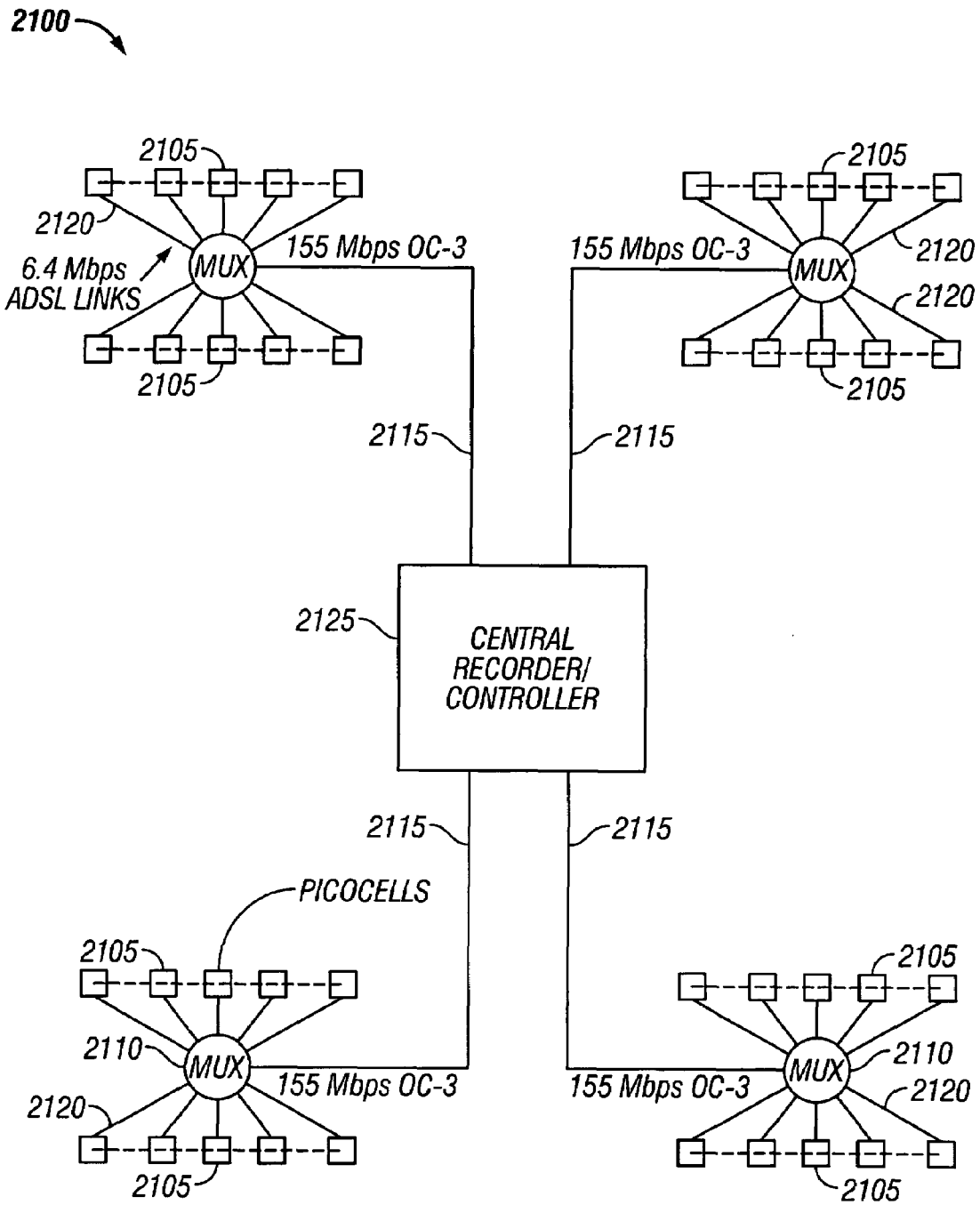
FIG. 21 is a schematic illustration of an embodiment of a hierarchical multiplexed seismic acquisition system including pico cells.

Referring to FIG. 21, an embodiment of a hierarchical multiplexed seismic acquisition system 2100 includes a plurality of cellular pico cells 2105, multiplexers 2110, wireline communication links 2115, wireline communication links 2120, and a central recorder/controller 2125.

The picocells 2105 are preferably grouped in rows, with each row of picocells 2105 coupled to an associated multiplexer 2110. In a preferred embodiment, the picocells 2105 are coupled to the associated multiplexer using the wireline communication links 2120. In a preferred embodiment, the picocells 2105 includes a picocell base station unit 1800 and groups A and B of wireless master sensor stations 1400.

The multiplexers 2110 are coupled to the associated rows of picocells 2105 and the central recorder/controller 2125. In a preferred embodiment, the multiplexers 2110 are coupled to the central recorder/controller 2125 using the wireline communication links 2115. In a preferred embodiment, each multiplexer 2110 is coupled to up to 20 picocells 2105.

The wireline communication links 2115 couple the multiplexers with the central recorder/controller 2125. In a preferred embodiment, the wireline communication links 2115 comprise 155 Mbps OC-3 fiber optic communication links.

The wireline communication links 2120 coupled the picocells 2105 to the multiplexers 2110. In a preferred embodiment, the wireline communication links 2120 comprise 6.4 Mbps ADSL twisted pair communication links.

The central recorder/controller 2125 is coupled to the multiplexers 2110. The central recorder/controller 2125 is preferably adapted to monitor and control the operation of the system 2100. In a preferred embodiment, the central recorder/controller 2125 is housed in a controller truck, centrally positioned within the array of picocells 2105. In a preferred embodiment, the central recorder/controller 2125 includes a wireline communication interface for coupling to the wireline communication links 2115, and a wireless communication link for coupling to the picocell base station units 1800. In this manner, the central recorder/controller 2125 preferably receives data via a wireline communication link and transmits control information via a wireless communication link.

In a preferred embodiment, the central recorder/controller 2125 receives data and demultiplexes the data into the component station data streams. The operator preferably accesses the data streams for verification or analysis. The entire data output of the array of picocells 2105 is preferably available on a real-time basis. In a preferred embodiment, the wireless communication link comprises a 220 MHZ radio channel and is used to transmit command information such as, for example, array configuration information and fire controls to the picocell base stations 1800, as well as other array components. The picocell base station 1800 preferably interpret the command information and assert the required control over their associated wireless master sensor stations 1400. In a preferred embodiment, this control information channel is operated as a relatively low bandwidth digital data link.

Figure 22:
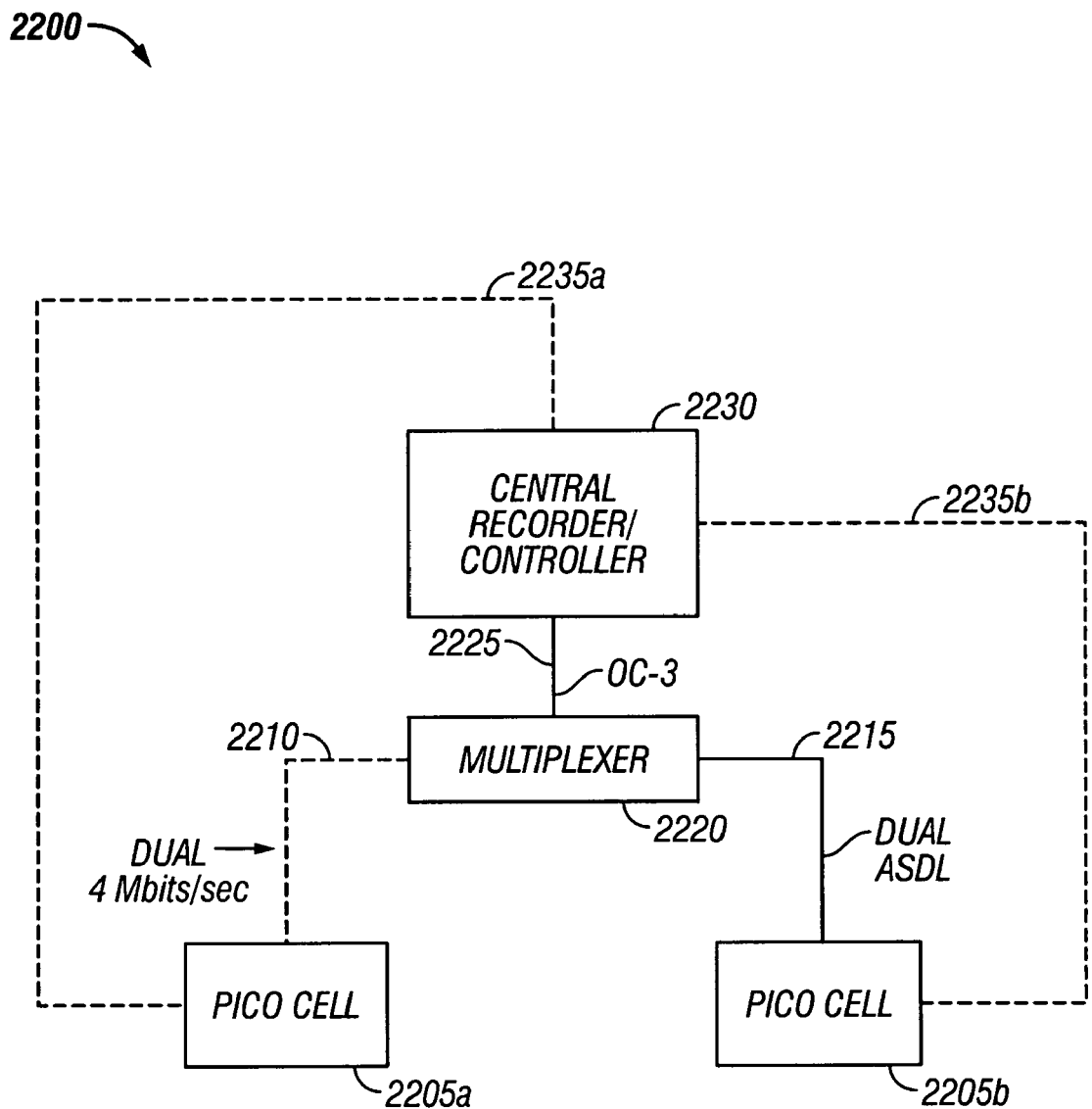
FIG. 22 is a schematic illustration of an embodiment of a hierarchical multiplexed seismic acquisition system including pico cells combined with wireline and wireless communication links.

Referring to FIG. 22, an embodiment of a seismic acquisition system 2200 includes a plurality of pico cells 2205, a wireless communication link 2210, a wireline communication link 2215, a multiplexer 2220, a communication link 2225, a central controller/recorder 2230, and wireless communication links 2235a and 2235b.

The picocells 2205a and 2205b are coupled to the multiplexer 2200 and the central recorder/controller 2230. In a preferred embodiment, the picocells 2205a and 2205b comprise a plurality of picocells 2105. In a preferred embodiment, the picocell 2205a is coupled to the multiplexer 2200 using a wireless communication link 2210. In a preferred embodiment, the wireless communication link 2210 comprises a dual 4 Mbps wireless communication link. In a preferred embodiment, the picocell 2205b is coupled to the multiplexer 2220 using a wireline communication link 2215. In a preferred embodiment, the wireline communication link 2215 comprises a dial ADSL wireline communication link. In a preferred embodiment, the picocells 2205a and 2205b are coupled to the central recorder/controller 2230 using the wireless communication links 2235a and 2235b. In a preferred embodiment, the wireless communication links 2235a and 2235b comprise 200 MHZ radio communication links.

The multiplexer 2220 is coupled to the picocells 2205a and 2205b and the central recorder/controller 2230. In a preferred embodiment, the multiplexer 2220 is coupled to the central recorder/controller 2230 using the wireline communication link 2225. In a preferred embodiment, the wireline communication link 2225 comprises an OC-3 fiber optic communication link.

The central recorder/controller 2230 is coupled to the multiplexer 2220 and the picocells 2205a and 2205b. In a preferred embodiment, the central recorder/controller 2230 is coupled to the picocells 2205a and 2205b using the wireless communication links 2235 and 2240. In this manner, the central recorder/controller 2230 receives data via the wireline communication link 2225 and transmits control information via the wireless communication links 2235a and 2235b.

In a preferred embodiment, the systems 1900, 2100 and 2200 utilize a number of data transport and error correction methods to optimize the transmission of information.

In a preferred embodiment, for unidirectional data channels, the systems 1900, 2100 and 2200 utilize one or more of the following conventional forward error correction (FEC) codes: viterbi codes; half rate viterbi codes, ⅔rds rate viterbi codes, convolutional codes.

In a preferred embodiment, when a data backchannel is available and time constraints allow, the systems 1900, 2100 and 2200 utilize conventional automatic retransmission requests (ARQ) techniques.

In a preferred embodiment, for twisted pair wireline communication links, the systems 1900, 2100 and 2200, utilize conventional parity checking and/or ARQ.

In a preferred embodiment, for wireless communication links, the systems 1900, 2100 and 2200, utilize conventional ARQ.

Figure 23:
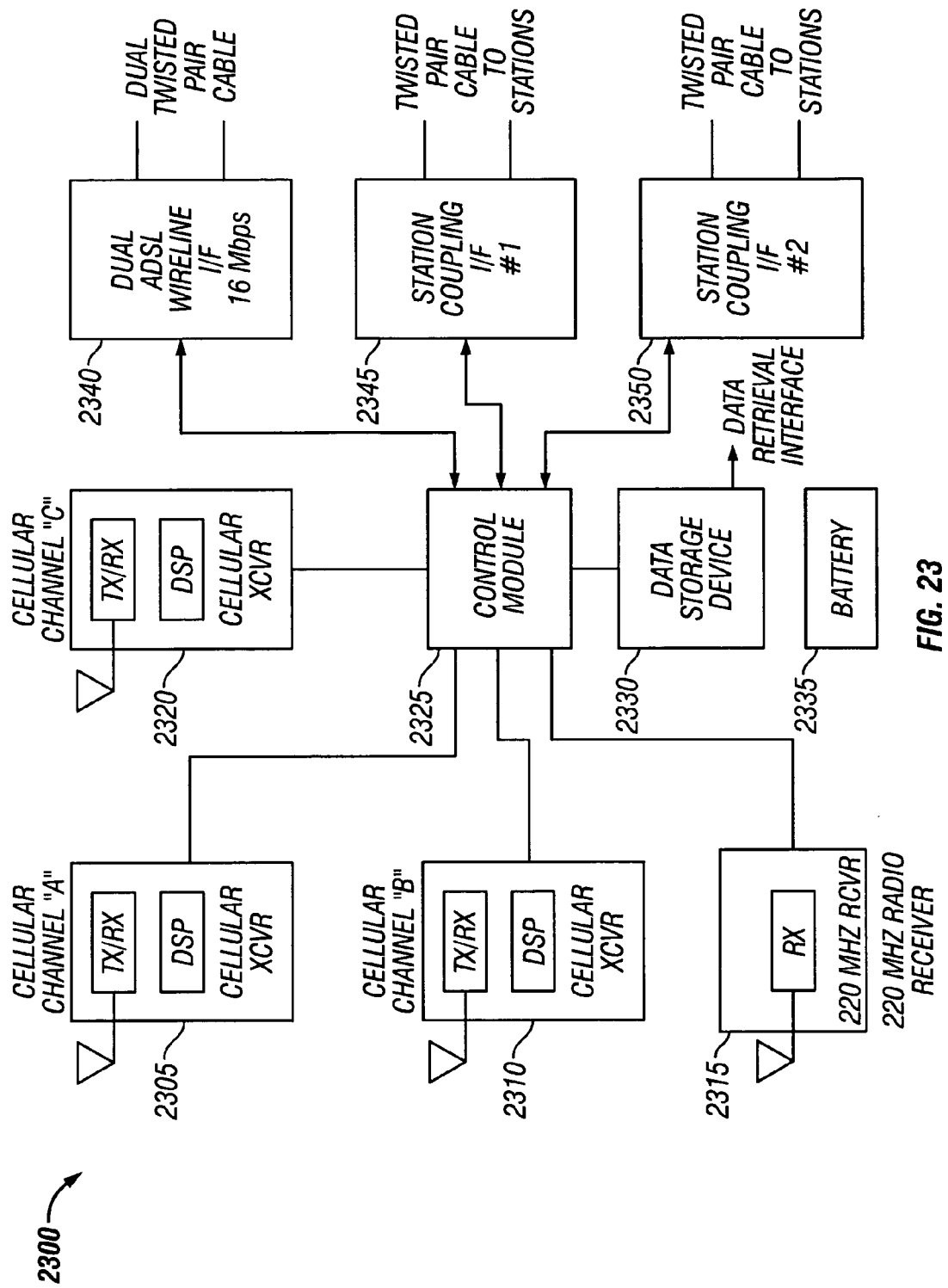
FIG. 23 is a schematic illustration of an embodiment of a storage pico cell base station for use in a seismic acquisition system.

Referring to FIG. 23, an embodiment of a storage pico cell base station 2300 including data storage includes a channel A cellular transceiver 2305, a channel B cellular transceiver 2310, a radio receiver 2315, a channel C cellular transceiver 2320, a control module 2325, a data storage device 2330, a battery 2335, a first wireline interface 2340, a second wireline interface 2345, and a third wireline interface 2350. In a preferred embodiment, the storage picocell base station 2300 is substantially identical to the picocell base station 1800 with the addition of data storage. In a preferred embodiment, the storage picocell base station 2300 is coupled to one or more wireless master sensor stations 1400 and one or more twisted pair sensor stations 1600. In a particularly preferred embodiment, the storage picocell base station 2300 is coupled to first and second groups of wireless master sensor stations 1400, with each group corresponding to different operating frequencies. In this manner, a cellular picocell with data storage is formed.

The channel A cellular transceiver 2305 is operably coupled to the control module 2325. In a preferred embodiment, the channel A cellular transceiver 2305 is further coupled to an associated A group of wireless master sensor stations 1400. In a preferred embodiment, the channel A cellular transceiver 2305 receives seismic data from its associated A group of wireless master sensor stations 1400.

The channel B cellular receiver 2310 is operably coupled to the control module 2325. In a preferred embodiment, the channel B cellular transceiver 2310 is further coupled to an associated B group of wireless master sensor stations 1400. In a preferred embodiment, the channel B cellular transceiver 2310 receives seismic data from its associated B group of wireless master sensor stations 1400.

The radio receiver 2315 is coupled to the control module 2325. In a preferred embodiment, the radio receiver 2315 is further coupled to a controller for a seismic acquisition system. In this manner, the picocell base station unit 2300 receives control information from and transmits diagnostic information to a controller.

The channel C cellular transceiver 2320 is operably coupled to the control module 2325. In a preferred embodiment, the channel C cellular transceiver 2320 is further coupled to the associated A and B group of wireless master sensor stations 1400. In a preferred embodiment, the channel C cellular transceiver 2320 transmits control information to the associated A and B group of wireless master sensor stations 1400.

The control module 2325 is coupled to the remaining elements of the picocell base station 2300. In a preferred embodiment, the control module 2325 is adapted to control the operation of the picocell base station 2300.

The data storage device 2330 is coupled to the control module 2325 and a data retrieval interface. The data storage device 2330 is preferably adapted to store all of the data collected for several days from the associated wireless master sensor stations 1400 and/or twisted pair sensor stations 1600. In this manner, the need to transport all of the data to a central recorder/controller is alleviated. In an exemplary embodiment, the data storage device 2330 includes about 28.8 Gbytes of storage capacity.

The battery 2335 is coupled to the remaining elements of the storage picocell base station 2300. The battery 2335 may comprise any number of conventional commercially available batteries suitable for outdoor use.

The first wireline interface 2340 is preferably coupled to a high data rate hierarchical multiplexer system. In a preferred embodiment, the multiplexer system in turn transmits the received data to a seismic system controller in real time. In a preferred embodiment, the first wireline interface 2340 comprises a dual ADSL twisted pair cable interface.

The second wireline interface 2345 is preferably coupled to one or more twisted pair sensor stations 1600. In a preferred embodiment, the second wireline interface 2345 comprises a twisted pair wireline interface. The third wireline interface 2350 is preferably coupled to one or more twisted pair sensor stations 1600. In a preferred embodiment, the third wireline interface 2350 comprises a twisted pair wireline interface.

Figure 24:
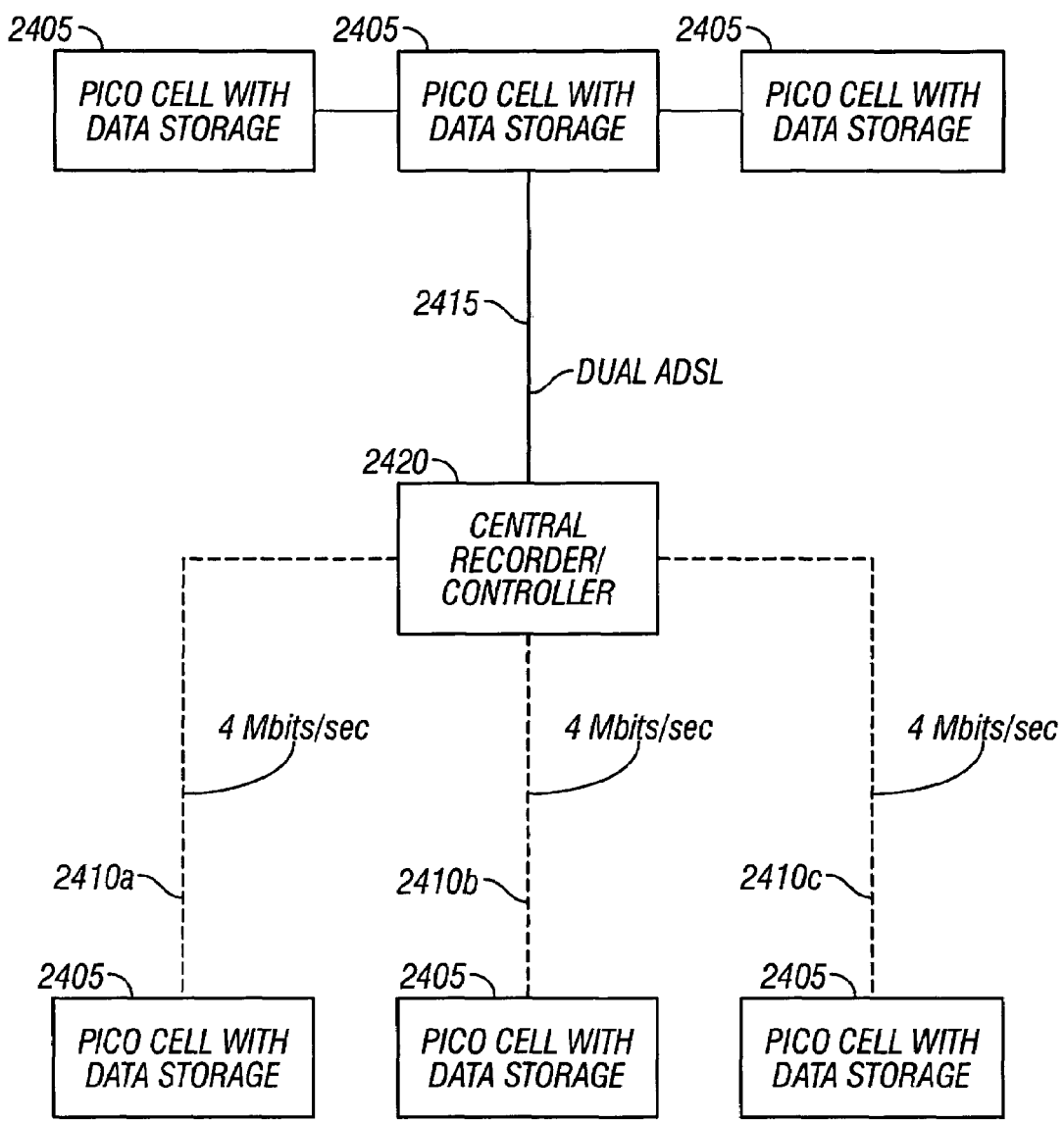
FIG. 24 is a schematic illustration of an embodiment of a hierarchical multiplexed seismic acquisition system including storage pico cells combined with wireline and wireless communication links.

Referring to FIG. 24, an embodiment of a seismic acquisition system 2400 includes a plurality of cellular picocells 2405 including data storage, wireless communication links 2410a, 2410b and 2410c, wireline communication link 2415, and a central recorder/controller with data storage 2420.

The cellular picocells with data storage 2405 are coupled to the central recorder controller 2420. In a preferred embodiment, at least a portion of the cellular picocells with data storage 2405 are coupled to the central recorder/controller 2420 using one of the wireless communication links 2410, and the remaining portion of the cellular picocells with data storage 2405 are coupled to the central recorder/controller 2420 using the wireline communications links 2415. In a preferred embodiment, the wireless communication links 2410 comprise a 4 Mbps wireless communication link. In a preferred embodiment, the wireline communication link 2415 comprises a dual ADSL twisted pair communication link. In a preferred embodiment, the cellular picocells with data storage 2405 include a storage picocell base station 2300 and associated groups A and B of wireless master sensor stations 1400.

The central recorder/controller 2420 is preferably adapted to monitor and control the operation of the pico cells with storage 2405. In a preferred embodiment, the central recorder/controller 2420 further includes a 220 MHZ radio transceiver for transmitting control information to the picocells with storage 2405. Alternatively, the central recorder/controller 2420 transmits control information to the pico cells with data storage 2405 using an ADSL backchannel. In an alternative embodiment, all of the picocells with data storage 2405 are coupled to the central recorder/controller 2420 using a dual ADSL twisted pair communication link. In an alternative embodiment, any one of the picocells with data storage 2405 can be coupled to the central recorder/controller 2420 using a wireless 4 Mbps communication link.

A method of dividing up a communication channel for use in a seismic acquisition system having M base stations and N sensors has been described that includes dividing up the communication channel into M frequency bands and dividing up each frequency band into N+1 time slots. In a preferred embodiment, the N+1 time slots include N time slots for transmitting information from each of the sensors to a base station and one time slot for transmitting information from the base station to the sensors.

A method of dividing up a communication channel for use in a seismic acquisition system has also been described that includes dividing up the communication channel into time slots including signaling and status bits, seismic information, and guard time.

A method of transmitting information from a sensor to a base station in a seismic acquisition system has also been described that includes listening for an open time slot, frequency, and sector, requesting use of the available time slot from the base station, if the base station is operating at full capacity, then reducing the overall data for the base station, and if the base station is not operating at full capacity, then capturing the open time slot and transmitting to the base station.

A method of error correction in a communication system for a seismic acquisition system including a sensor and a base station has also been described that includes transmitting data from the sensor to the base station and if the data includes errors, then retransmitting the data.

A method of error correction in a communication system for a seismic acquisition system including a sensor and a base station has also been described that includes transmitting data from the sensor to the base station and if the data includes errors, then requesting retransmission of the data.

A method of error correction in a communication system for a seismic acquisition system including a sensor and a base station has also been described that includes transmitting data from the sensor to the base station, if the data includes errors, then retransmitting during non-active time.

A method of transmitting information in a communication channel in a seismic acquisition system including a plurality of sensors positioned at different distance from a base station has also been described that includes transmitting information from one of the sensors to the base station, and if the sensor is a nearby sensor, then adjusting the modulation in the communication channel to increase the data density.

A method of transmitting information from a sensor to a base station in a seismic acquisition system having a plurality of communication channels has also been described that includes selecting a channel for transmission from the sensor to the base station, if no channels are available, then waiting until a channel is available, if the selected channel is available, then transmitting the information from the sensor to the base station, if the selected channel is impaired, then selecting another channel, if all of the information has not been properly transmitted, then adjusting to a lower order modulation and transmitting a request for retransmission from the base station to the sensor, and if all of the information has been properly transmitted, then adjusting to a lower order modulation and transmitting control information from the base station to the sensor. In a preferred embodiment, the method further includes using the sensor to monitor the communication channels. In a preferred embodiment, the method further includes using the sensor to maintain a record of the available channels. In a preferred embodiment, the seismic acquisition system includes a plurality of base stations; and wherein selecting a channel includes selecting a base station.

A base station for use in a seismic acquisition system has also been described that includes a transceiver, one or more diversity antennas, and one or more directional antennas. In a preferred embodiment, the diversity antennas provide coverage for 6 to 12 sectors. In a preferred embodiment, the sectors overlap. In a preferred embodiment, the transceiver is adapted to dynamically allocate data capacity from lightly loaded sectors to heavily loaded sectors.

A method of selecting an antenna for transmitting information in a seismic acquisition system having a plurality of antennas has also been described that includes determining the data density for each antenna, selecting the optimum antenna for transmitting information, transmitting the information using the selected optimum antenna, and subsequently receiving information using the selected optimum antenna. In a preferred embodiment, wherein selecting includes selecting the antenna having the lowest data density.

A seismic acquisition system has also been described that includes one or more sensors adapted to sense conditions and generate signals representative of the sensed conditions including a memory for storing the signals, a base station operably coupled to the sensors for receiving and transmitting the signals including a memory for storing the signals, and a recorder operably coupled to the base station for storing the signals. In a preferred embodiment, the base station includes one or more diversity antennas, and a microwave antenna. In a preferred embodiment, the system further includes a wireline communication link for coupling the base station and the recorder. In a preferred embodiment, the sensors are adapted to transmit previously stored signals to the base station. In a preferred embodiment, the base station is adapted to transmit previously stored signals to the recorder.

A method of communicating in a seismic acquisition system having sensors, base stations and a recorder has also been described that includes storing data in the sensors, transmitting data from the sensors to the base stations, storing data in the base stations, and transmitting data from the base stations to the recorder.

A seismic acquisition system has also been described that includes one or more sensors adapted to sense conditions and transmit signals representative of the sensed conditions, one or more base stations operably coupled to the sensors adapted to receive and transmit the signals, and a recorder operably coupled to the sensors and the base stations adapted to receive the signals and transmit control information to the sensors. In a preferred embodiment, the base station includes one or more diversity antennas and a microwave antenna. In a preferred embodiment, the recorder includes one or more diversity antennas and a microwave antenna. In a preferred embodiment, the system further includes a dedicated communication link for coupling the sensors to the recorder. In a preferred embodiment, the recorder is adapted to synchronize the operation of the sensors.

A seismic acquisition system has also been described that includes a plurality of rows of sensor stations for sensing conditions and transmitting signals representative of the sensed conditions, a plurality of base stations coupled to the rows of sensor stations for receiving and transmitting the signals, and a recorder operably coupled to the base stations for receiving the signals. In a preferred embodiment, the system further includes one or more cellular wireless communications links for coupling the sensor stations and the recorder. In a preferred embodiment, the cellular wireless communication links includes frequency division multiple access. In a preferred embodiment, the cellular wireless communication links includes time division multiple access. In a preferred embodiment, the cellular wireless communication links includes code division multiple access. In a preferred embodiment, the system further includes one or more cellular wireless communications links for coupling the base stations and the sensor stations. In a preferred embodiment, the cellular wireless communication links include frequency division multiple access. In a preferred embodiment, the cellular wireless communication links includes time division multiple access. In a preferred embodiment, the cellular wireless communication links includes code division multiple access. In a preferred embodiment, the sensor stations include one or more 3-axis sensors. In a preferred embodiment, the recorder is adapted to transmit audio signals to the sensor stations. In a preferred embodiment, the recorder is adapted to transmit differential GPS information to the sensor stations. In a preferred embodiment, the recorder is adapted to transmit pager messages to the sensor stations. In a preferred embodiment, the system further includes one or more wireline communication-links for coupling the sensor stations and the base stations. In a preferred embodiment, the wireline communication link comprises a twisted pair communication link. In a preferred embodiment, the twisted pair communication link includes an asymmetric digital subscriber loop. In a preferred embodiment, the twisted pair communication link includes a high speed digital subscriber loop. In a preferred embodiment, the twisted pair communication link includes a very-high speed digital subscriber loop. In a preferred embodiment, the twisted pair communication link includes a T1 connection. In a preferred embodiment, the twisted pair communication link includes an E1 connection. In a preferred embodiment, the wireline communication link comprises a coaxial cable. In a preferred embodiment, the coaxial communication link includes an Ethernet connection. In a preferred embodiment, the coaxial communication link includes a T4 connection. In a preferred embodiment, the coaxial communication link includes an E4 connection. In a preferred embodiment, the wireline communication link comprises a fiber optic cable. In a preferred embodiment, the fiber optic communication link includes an FDDI fiber optic backbone. In a preferred embodiment, the fiber optic communication link includes an OC-3 connection. In a preferred embodiment, the system further includes one or more wireline communication links for coupling the base stations and the recorder. In a preferred embodiment, the wireline communication link comprises a twisted pair. In a preferred embodiment, the twisted pair communication link includes an asymmetric digital subscriber loop. In a preferred embodiment, the twisted pair communication link includes a high speed digital subscriber loop. In a preferred embodiment, the twisted pair communication link includes a very-high speed digital subscriber loop. In a preferred embodiment, the twisted pair communication link includes a T1 connection. In a preferred embodiment, the twisted pair communication link includes an E1 connection. In a preferred-embodiment, the wireline communication link comprises a coaxial cable. In a preferred embodiment, the coaxial communication link includes an Ethernet connection. In a preferred embodiment, the coaxial communication link includes a T4 connection. In a preferred embodiment, the coaxial communication link includes an E4 connection. In a preferred embodiment, the wireline communication link comprises a fiber optic cable. In a preferred embodiment, the fiber optic communication link includes an FDDI fiber optic backbone. In a preferred embodiment, the fiber optic communication link includes an OC-3 connection.

A wireless master sensor station has also been described that includes a transceiver for transmitting and receiving information including a directional antenna, a control module coupled to the transceiver for monitoring and controlling the operation of the wireless master sensor station, and a sensor module coupled to the control module for sensing conditions and generating signals representative of the sensed conditions. In a preferred embodiment, the transceiver provides time division multiple access. In a preferred embodiment, the transceiver provides frequency division multiple access. In a preferred embodiment, the transceiver provides code division multiple access. In a preferred embodiment, the transceiver provides direct sequence spread spectrum and time division multiple access. In a preferred embodiment, the sensor module includes a 3-axis sensor. In a preferred embodiment, the sensor module includes digital to analog converter. In a preferred embodiment, the wireless master sensor station further includes a sensor coupling module coupled to the control module for coupling the wireless master sensor station to other sensors. In a preferred embodiment, the wireless master sensor station is adapted to monitor and control the operation of one or more slave sensors. In a preferred embodiment, the wireless master sensor station is adapted to receive sensor data from the slave sensors. In a preferred embodiment, the transceiver includes a digital signal processor. In a preferred embodiment, the control module is adapted to provide maintenance functions. In a preferred embodiment, the control module is adapted to provide diagnostic functions. In a preferred embodiment, the wireless master sensor station further includes a data storage device coupled to the control module.

A sensor assembly has also been described that includes a wireless master sensor station and one or more slave sensor stations operably coupled to the wireless master sensor station. The wireless master sensor station includes a transceiver for transmitting and receiving information including a directional antenna, a control module coupled to the transceiver for monitoring and controlling the operation of the wireless master sensor station, and a sensor module coupled to the control module for sensing conditions and generating signals representative of the sensed conditions. The slave sensor stations include a sensor module sensing conditions and generating signals representative of the sensed conditions. In a preferred embodiment, the wireless master sensor station further includes a data storage device coupled to the control module.

A twisted pair sensor station has also been described that includes a sensor coupling module for coupling the sensor station to a wireline connection, a control module coupled to the sensor coupling module for monitoring and controlling the operation of the sensor station, and a sensor module coupled to the control module for sensing conditions and generating signals representative of the sensed conditions. In a preferred embodiment, the sensor coupling module provides an asymmetrical digital subscriber loop. In a preferred embodiment, the sensor coupling module provides a high speed digital subscriber loop. In a preferred embodiment, the sensor coupling module provides a very-high speed digital subscriber loop. In a preferred embodiment, the sensor coupling module provides a T1 connection. In a preferred embodiment, the sensor coupling module provides an E1 connection. In a preferred embodiment, the sensor module includes a 3-axis sensor. In a preferred embodiment, the sensor module includes digital to analog converter. In a preferred embodiment, the control module is adapted to provide maintenance functions. In a preferred embodiment, the control module is adapted to provide diagnostic functions. In a preferred embodiment, the twisted pair sensor station further includes a data storage device coupled to the control module.

A sensor assembly has also been described that includes a plurality of twisted pair sensor stations operably coupled to one another. Each twisted pair sensor station includes a sensor coupling module for coupling the sensor station to a wireline connection, a control module coupled to the sensor coupling module for monitoring and controlling the operation of the sensor station, and a sensor module coupled to the control module for sensing conditions and generating signals representative of the sensed conditions. In a preferred embodiment, each twisted pair sensor station includes a data storage device coupled to the control module.

A picocell base station has also been described that includes a first cellular transceiver including a first antenna, a second cellular transceiver including a second antenna, a third cellular transceiver including a third antenna, a radio transceiver including a radio antenna, a control module coupled to the first, second and third cellular transceivers and the radio transceiver, a first wireline interface coupled to the control module, a second wireline interface coupled to the control module, and a third wireline interface coupled to the control module. In a preferred embodiment, the first wireline interface provides a dual asymmetric digital subscriber line. In a preferred embodiment, the first antenna includes side lobe suppression. In a preferred embodiment, the second antenna includes side lobe suppression. In a preferred embodiment, the third antenna includes side lobe suppression. In a preferred embodiment, the first cellular transceiver provides code division multiple access. In a preferred embodiment, the first cellular transceiver provides time division multiple access. In a preferred embodiment, the first cellular transceiver provides frequency division multiple access. In a preferred embodiment, the second cellular transceiver provides code division multiple access. In a preferred embodiment, the second cellular transceiver provides time division multiple access. In a preferred embodiment, the second cellular transceiver provides frequency division multiple access. In a preferred embodiment, the third cellular transceiver provides code division multiple access. In a preferred embodiment, the third cellular transceiver provides time division multiple access. In a preferred embodiment, the third cellular transceiver provides frequency division multiple access. In a preferred embodiment, the operating frequencies of the first and second cellular transceivers are different. In a preferred embodiment, the operating frequencies of the first and second cellular transceivers are positioned at the upper and lower ends of the selected operating frequency band. In a preferred embodiment, the selected operating frequency band comprises the 2.4 GHz ISM frequency band. In a preferred embodiment, the radio antenna is vertically polarized. In a preferred embodiment, the picocell base station further includes a data storage device coupled to the control module.

A picocell has also been described that includes a first group of wireless master sensor stations adapted to collect and transmit data, a second group of wireless master sensor stations adapted to collect and transmit data, and a picocell base station coupled to the first and second group of wireless master sensor stations adapted to receive the data from the wireless master sensor stations and transmit it to an external device. In a preferred embodiment, the first and second group of wireless master sensor stations are positioned on different sides of the picocell base station. In a preferred embodiment, the first and second groups of wireless master sensor stations are positioned in rows. In a preferred embodiment, the first and second groups of wireless master sensor stations are positioned on opposite sides of the picocell base station. In a preferred embodiment, the picocell further includes a first wireless cellular communication link for coupling the first group of wireless master sensor stations to the picocell base station, and a second wireless cellular communication link for coupling the second group of wireless master sensor stations to the picocell base station. In a preferred embodiment, further includes a third wireless cellular communication link for coupling the picocell base station to the first and second group of wireless master sensor stations. In a preferred embodiment, the first and second wireless cellular communication links include code division multiple access. In a preferred embodiment, the first and second wireless cellular communication links include time division multiple access. In a preferred embodiment, the first wireless cellular communication link includes a first operating frequency; wherein the second wireless cellular communication link includes a second operating frequency; and wherein the first and second operating frequencies are different. In a preferred embodiment, the first and second operating frequencies lie at different regions of the selected operating frequency band. In a preferred embodiment, the first wireless cellular communication link includes separate time slots for the transmission of data from each of the wireless master sensor stations in the first group. In a preferred embodiment, the first wireless cellular communication link includes time slots for the retransmission of data from the wireless master sensor stations in the first group. In a preferred embodiment, the second wireless cellular communication link includes separate time slots for the transmission of data from each of the wireless master sensor stations in the second group. In a preferred embodiment, the second wireless cellular communication link includes time slots for the retransmission of data from the wireless master sensor stations in the second group. In a preferred embodiment, the third wireless cellular communication link includes code division multiple access. In a preferred embodiment, the third wireless cellular communication link includes time division multiple access. In a preferred embodiment, the third wireless cellular communication link includes time slots for requesting the retransmission of data from the wireless master sensor stations in the first and second groups to the picocell base station. In a preferred embodiment, each wireless master sensor station includes data storage.

A seismic acquisition system has also been described that includes a plurality of rows of picocells, each picocell adapted to collect and transmit data and a controller coupled to the picocells adapted to control and monitor the picocells and receive data from the picocells. In a preferred embodiment, each picocell includes a first group of wireless master sensor stations adapted to collect and transmit data, a second group of wireless master sensor stations adapted to collect and transmit data, and a picocell base station coupled to the first and second group of wireless master sensor stations and the controller adapted to receive the data from the wireless master sensor stations and transmit it to the controller. In a preferred embodiment, the first and second group of wireless master sensor stations are positioned on different sides of the picocell base station. In a preferred embodiment, the first and second groups of wireless master sensor stations are positioned in rows. In a preferred embodiment, the first and second groups of wireless master sensor stations are positioned on opposite sides of the picocell base station. In a preferred embodiment, the system further includes a first wireless cellular communication link for coupling the first group of wireless master sensor stations to the picocell base station and a second wireless cellular communication link for coupling the second group of wireless master sensor stations to the picocell base station. In a preferred embodiment, the system further includes a third wireless cellular communication link for coupling the picocell base station to the first and second group of wireless master sensor stations. In a preferred embodiment, the first and second wireless cellular communication links include code division multiple access. In a preferred embodiment, the first and second wireless cellular communication links include time division multiple access. In a preferred embodiment, the first wireless cellular communication link includes a first operating frequency; wherein the second wireless cellular communication link includes a second operating frequency; and wherein the first and second operating frequencies are different. In a preferred embodiment, the first and second operating frequencies lie at different regions of the selected operating frequency band. In a preferred embodiment, the first wireless cellular communication link includes separate time slots for the transmission of data from each of the wireless master sensor stations in the first group. In a preferred embodiment, the first wireless cellular communication link includes time slots for the retransmission of data from the wireless master sensor stations in the first group. In a preferred embodiment, the second wireless cellular communication link includes separate time slots for the transmission of data from each of the wireless master sensor stations in the second group. In a preferred embodiment, the second wireless cellular communication link includes time slots for the retransmission of data from the wireless master sensor stations in the second group. In a preferred embodiment, the third wireless cellular communication link includes time slots for requesting the retransmission of data from the wireless master sensor stations in the first and second groups to the picocell base station. In a preferred embodiment, the third wireless cellular communication link includes code division multiple access. In a preferred embodiment, the third wireless cellular communication link includes time division multiple access. In a preferred embodiment, each picocell is operably coupled to the controller using a wireless communication link. In a preferred embodiment, each picocell is operably coupled to the controller using a wireline communication link. In a preferred embodiment, a portion of the picocells are operably coupled to the controller using a wireless communication link and the remaining portion of the picocells are operably coupled to the controller using a wireline communication link. In a preferred embodiment, each picocell base station includes data storage.

A method of communicating information between a base station and a plurality of sensors in a seismic acquisition system has also been described that includes dividing the sensors into first and second groups of sensors, transmitting information from the base station to the first group of sensors using a first communication channel, transmitting information from the base station to the second groups of sensors using a second communication channel, and transmitting information from the base station to the first and second groups of sensors using a third communication channel. In a preferred embodiment, the method further includes dividing the first communication channel into time slots including sensor transmissions of information for each sensor in the first group, and retransmission of information from selected sensors in the first group, and dividing the second communication channel into time slots including sensor transmissions of information for each sensor in the second group, and retransmission of information from selected sensors in the second group. In a preferred embodiment, the method further includes dividing the third communication channel into time slots for requesting retransmissions of information by selected sensors in the first and second groups.

A method of transmitting packets of information from sensors to a base station in a seismic acquisition system using a communication channel has also been described that includes dividing the communication channel into a plurality of time slots including time slots for each of the sensors, wherein each sensor time slot includes time slots for transmission of the sensor identification, the sensor status, the information packet number, the information, and error detection information for the transmitted information.

A seismic acquisition system has also been described that includes a plurality of rows of picocells for collecting and transmitting data, a plurality of multiplexers coupled to the rows of picocells, and a controller coupled to the multiplexers and the picocells for recording the data, and monitoring and controlling the picocells. In a preferred embodiment, each picocell includes a first group of wireless master sensor stations adapted to collect and transmit data, a second group of wireless master sensor stations adapted to collect and transmit data, and a picocell base station coupled to the first and second group of wireless master sensor stations and the controller adapted to receive the data from the wireless master sensor stations and transmit it to the controller. In a preferred embodiment, the first and second group of wireless master sensor stations are positioned on different sides of the picocell base station. In a preferred embodiment, first and second groups of wireless master sensor stations are positioned in rows. In a preferred embodiment, the first and second groups of wireless master sensor stations are positioned on opposite sides of the picocell base station. In a preferred embodiment, the system further includes a first wireless cellular communication link for coupling the first group of wireless master sensor stations to the picocell base station and a second wireless cellular communication link for coupling the second group of wireless master sensor stations to the picocell base station. In a preferred embodiment, the system further includes a third wireless cellular communication link for coupling the picocell base station to the first and second group of wireless master sensor stations. In a preferred embodiment, the first and second wireless cellular communication links include code division multiple access. In a preferred embodiment, the first and second wireless cellular communication links include time division multiple access. In a preferred embodiment, the first wireless cellular communication link includes a first operating frequency; wherein the second wireless cellular communication link includes a second operating frequency; and wherein the first and second operating frequencies are different. In a preferred embodiment, the first and second operating frequencies lie at different regions of the selected operating frequency band. In a preferred embodiment, the first wireless cellular communication link includes separate time slots for the transmission of data from each of the wireless master sensor stations in the first group. In a preferred embodiment, the first wireless cellular communication link includes time slots for the retransmission of data from the wireless master sensor stations in the first group. In a preferred embodiment, the second wireless cellular communication link includes separate time slots for the transmission of data from each of the wireless master sensor stations in the second group. In a preferred embodiment, the second wireless cellular communication link includes time slots for the retransmission of data from the wireless master sensor stations in the second group. In a preferred embodiment, the third wireless cellular communication link includes time slots for requesting the retransmission of data from the wireless master sensor stations in the first and second groups to the picocell base station. In a preferred embodiment, the third wireless cellular communication link includes code division multiple access. In a preferred embodiment, the third wireless cellular communication link includes time division multiple access. In a preferred embodiment, each picocell is operably coupled to the controller using a wireless communication link. In a preferred embodiment, each picocell is operably coupled to the controller using a wireline communication link. In a preferred embodiment, a portion of the picocells are operably coupled to the controller using a wireless communication link and the remaining portion of the picocells are operably coupled to the controller using a wireline communication link. In a preferred embodiment, each of the picocells are coupled to a corresponding multiplexer using a wireline communication link. In a preferred embodiment, the wireline communication links includes an asymmetrical digital subscriber link. In a preferred embodiment, each of the multiplexers are coupled to the controller using a wireline communication link. In a preferred embodiment, the wireline communication link comprises a fiber optic link. In a preferred embodiment, the fiber optic link provides an OC-3 link. In a preferred embodiment, each picocell includes data storage.

A seismic acquisition system has also been described that includes a first pico cell for collecting and transmitting data, a second pico cell for collecting and transmitting data, a multiplexer coupled to the first and second pico cells, and a controller coupled to the first and second pico cells and the multiplexer for monitoring and controlling the picocells and collecting and recording the data. In a preferred embodiment, each picocell includes a first group of wireless master sensor stations adapted to collect and transmit data, a second group of wireless master sensor stations adapted to collect and transmit data, and a picocell base station coupled to the first and second group of wireless master sensor stations and the controller adapted to receive the data from the wireless master sensor stations and transmit it to the controller. In a preferred embodiment, the first and second group of wireless master sensor stations are positioned on different sides of the picocell base station. In a preferred embodiment, the first and second groups of wireless master sensor stations are positioned in rows. In a preferred embodiment, the first and second groups of wireless master sensor stations are positioned on opposite sides of the picocell base station. In a preferred embodiment, the system further includes a first wireless cellular communication link for coupling the first group of wireless master sensor stations to the picocell base station, and a second wireless cellular communication link for coupling the second group of wireless master sensor stations to the picocell base station. In a preferred embodiment, the system further includes a third wireless cellular communication link for coupling the picocell base station to the first and second group of wireless master sensor stations. In a preferred embodiment, the first and second wireless cellular communication links include code division multiple access. In a preferred embodiment, the first and second wireless cellular communication links include time division multiple access. In a preferred embodiment, the first wireless cellular communication link includes a first operating frequency; wherein the second wireless cellular communication link includes a second operating frequency; and wherein the first and second operating frequencies are different. In a preferred embodiment, the first and second operating frequencies lie at different regions of the selected operating frequency band. In a preferred embodiment, the first wireless cellular communication link includes separate time slots for the transmission of data from each of the wireless master sensor stations in the first group. In a preferred embodiment, the first wireless cellular communication link includes time slots for the retransmission of data from the wireless master sensor stations in the first group. In a preferred embodiment, the second wireless cellular communication link includes separate time slots for the transmission of data from each of the wireless master sensor stations in the second group. In a preferred embodiment, the second wireless cellular communication link includes time slots for the retransmission of data from the wireless master sensor stations in the second group. In a preferred embodiment, the third wireless cellular communication link includes time slots for requesting the retransmission of data from the wireless master sensor stations in the first and second groups to the picocell base station. In a preferred embodiment, the third wireless cellular communication link includes code division multiple access. In a preferred embodiment, the third wireless cellular communication link includes time division multiple access. In a preferred embodiment, each picocell is operably coupled to the controller using a wireless communication link. In a preferred embodiment, each picocell is operably coupled to the controller using a wireline communication link. In a preferred embodiment, a portion of the picocells are operably coupled to the controller using a wireless communication link and the remaining portion of the picocells are operably coupled to the controller using a wireline communication link. In a preferred embodiment, the first picocell is coupled to the multiplexer using a wireline communication link and the second picocell is coupled to the multiplexer using a wireless communication link. In a preferred embodiment, the wireline communication links includes an asymmetrical digital subscriber link. In a preferred embodiment, the multiplexer is coupled to the controller using a wireline communication link. In a preferred embodiment, the wireline communication link comprises a fiber optic link. In a preferred embodiment, the fiber optic link provides an OC-3 link. In a preferred embodiment, each picocell base station includes data storage.

A seismic acquisition system has also been described that includes a plurality of pico cells having data storage and a controller coupled to the pico cells. In a preferred embodiment, each picocell includes a first group of wireless master sensor stations adapted to collect and transmit data, a second group of wireless master sensor stations adapted to collect and transmit data, and a picocell base station coupled to the first and second group of wireless master sensor stations and the controller adapted to receive the data from the wireless master sensor stations and transmit it to the controller. In a preferred embodiment, the first and second group of wireless master sensor stations are positioned on different sides of the picocell base station. In a preferred embodiment, the first and second groups of wireless master sensor stations are positioned in rows. In a preferred embodiment, the first and second groups of wireless master sensor stations are positioned on opposite sides of the picocell base station. In a preferred embodiment, the system further includes a first wireless cellular communication link for coupling the first group of wireless master sensor stations to the picocell base station and a second wireless cellular communication link for coupling the second group of wireless master sensor stations to the picocell base station. In a preferred embodiment, the system further includes a third wireless cellular communication link for coupling the picocell base station to the first and second group of wireless master sensor stations. In a preferred embodiment, the first and second wireless cellular communication links include code division multiple access. In a preferred embodiment, the first and second wireless cellular communication links include time division multiple access. In a preferred embodiment, the first wireless cellular communication link includes a first operating frequency; wherein the second wireless cellular communication link includes a second operating frequency; and wherein the first and second operating frequencies are different. In a preferred embodiment, the first and second operating frequencies lie at different regions of the selected operating frequency band. In a preferred embodiment, the first wireless cellular communication link includes separate time slots for the transmission of data from each of the wireless master sensor stations in the first group. In a preferred embodiment, the first wireless cellular communication link includes time slots for the retransmission of data from the wireless master sensor stations in the first group. In a preferred embodiment, the second wireless cellular communication link includes separate time slots for the transmission of data from each of the wireless master sensor stations in the second group. In a preferred embodiment, the second wireless cellular communication link includes time slots for the retransmission of data from the wireless master sensor stations in the second group. In a preferred embodiment, the third wireless cellular communication link includes time slots for requesting the retransmission of data from the wireless master sensor stations in the first and second groups to the picocell base station. In a preferred embodiment, the third wireless cellular communication link includes code division multiple access. In a preferred embodiment, the third wireless cellular communication link includes time division multiple access. In a preferred embodiment, each picocell is operably coupled to the controller using a wireless communication link. In a preferred embodiment, each picocell is operably coupled to the controller using a wireline communication link. In a preferred embodiment, the wireline communication link includes an asymmetrical digital subscriber link. In a preferred embodiment, a portion of the picocells are operably coupled to the controller using a wireless communication link and the remaining portion of the picocells are operably coupled to the controller using a wireline communication link.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A seismic data acquisition apparatus comprising:
a seismic sensor deployed at a seismic sensor location that is configured to: i) listen for an open time slot and frequency, and ii) request the use of the open slot;
a base station having a plurality of diversity antennas, the base station being configured to respond to the sensor request by reducing an overall data rate when operating at full capacity; and
a steerable antenna coupled to the base station wherein the steerable antenna is configured to receive a sensor signal from the seismic sensor location, monitor a strength of the received sensor signal, and determine a direction of the seismic sensor location from the strength of the received signal to steer the steerable antenna,
wherein the seismic sensor is configured to capture the open slot and transmit to the base station when the base station is not operating at full capacity, and wherein the base station is configured to select an optimum diversity antenna for transmission.

2. The apparatus of claim 1, wherein the steerable antenna scans a sector to determine the direction of the seismic sensor location.

3. The apparatus of claim 1, wherein the seismic sensor location comprises a plurality of seismic sensor locations, each of the plurality of seismic sensor locations having a seismic sensor, the steerable antenna being steerable to communicate with each of the plurality of seismic sensors.

4. The apparatus of claim 3, wherein the steerable antenna scans a substantially 360° sector around the base station for a received signal strength to determine a direction of each of the plurality of seismic sensors.

5. The apparatus of claim 1, wherein the seismic sensor location further comprises a plurality of seismic sensors and the base station further comprises a plurality of base stations.

6. The apparatus of claim 1, wherein the steerable antenna further comprises an active antenna array.

7. The apparatus of claim 1, wherein the steerable antenna further comprises an active beamformer.

8. The apparatus of claim 1, wherein the seismic sensor further comprises an active antenna array.

9. The apparatus of claim 1, wherein the seismic sensor further comprises an active beamformer.

10. The apparatus of claim 1 further comprising:
i) a recorder; and
ii) a recorder interface in communication with the recorder and the base station, the recorder interface receiving the sensor signal from the base station and transmitting the sensor signal to the recorder for recording the sensor signal.

11. The apparatus of claim 10, wherein the base station further comprises a wireless communication link coupling the base station to the recorder interface.

12. The apparatus of claim 11, wherein the wireless communication link comprises a pair of directional antennas.

13. The apparatus of claim 10, wherein the base station comprises a wireline communication link coupling the base station to the recorder interface.

14. The apparatus of claim 10, wherein the seismic sensor location further comprises a plurality of seismic sensor locations, each of the plurality of seismic sensor locations having a seismic sensor, the base station further comprising a plurality of base stations, each of the plurality of base stations having a steerable antenna, wherein each base station in the plurality of base stations is adapted to receive sensor signals from one or more of the plurality of seismic sensors.

15. The apparatus of claim 14, wherein at least one of the plurality of seismic sensors provides wireless communication with the base station that uses one or more of (1) time division, (2) frequency division, (3) code division, (4) space division, and (5) polarization division.

16. The apparatus of claim 14, wherein the plurality of steerable antennas and the plurality of seismic sensors form a plurality of communication links, each communication link utilizing a different wireless communication method.

17. The apparatus of claim 1, wherein the seismic sensor provides a wireless communication with the base station that is one of i) a combination of time and frequency division and ii) a combination of time and code division.

18. The apparatus of claim 1, wherein the seismic sensor provides a wireless communication with the base station using a frequency range for wireless transmission, the frequency range being within one of i) a 2.4 GHz to 2.4835 GHz band and ii) a VHF band.

19. The apparatus of claim 1, wherein upon detecting an error in transmission, the sensor is configured to perform one of: i) retransmit the erred packets at the end of a frame; ii) wait until the end of a record and request retransmission of data; and iii) store erred packets of data and retransmit during non-active time.

20. The apparatus of claim 1, wherein the seismic sensor is further configured to monitor a radio spectrum and maintain a log of available channels.

21. The apparatus of claim 1, wherein the base station is configured to determine a data density of each diversity antenna of the plurality of diversity antennas.

* * * * *